(12) United States Patent
Kawahito

(10) Patent No.: US 8,296,750 B2
(45) Date of Patent: Oct. 23, 2012

(54) OPTIMIZATION OF A TARGET PROGRAM

(75) Inventor: Motohiro Kawahito, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 1096 days.

(21) Appl. No.: 11/853,854

(22) Filed: Sep. 12, 2007

(65) Prior Publication Data

US 2008/0091926 A1    Apr. 17, 2008

(30) Foreign Application Priority Data

Oct. 11, 2006 (JP) ................................. 2006-277196

(51) Int. Cl.
 *G06F 9/44* (2006.01)
 *G06F 9/45* (2006.01)
 *G06F 9/26* (2006.01)
(52) U.S. Cl. ........ 717/160; 717/131; 717/154; 717/159; 712/226; 712/234; 712/241; 712/242; 711/213
(58) Field of Classification Search .................. None
 See application file for complete search history.

(56) References Cited

U.S. PATENT DOCUMENTS

| | | | |
|---|---|---|---|
| 5,586,323 A * | 12/1996 | Koizumi et al. | 717/174 |
| 5,828,886 A | 10/1998 | Hayashi | |
| 6,292,938 B1 * | 9/2001 | Sarkar et al. | 717/138 |
| 6,314,562 B1 * | 11/2001 | Biggerstaff | 717/156 |
| 6,343,375 B1 * | 1/2002 | Gupta et al. | 717/152 |
| 6,349,384 B1 | 2/2002 | Key et al. | |
| 6,507,947 B1 * | 1/2003 | Schreiber et al. | 717/160 |
| 6,546,550 B1 | 4/2003 | Ogata et al. | |
| 6,772,415 B1 * | 8/2004 | Danckaert et al. | 717/161 |
| 7,185,330 B1 * | 2/2007 | Khu | 717/160 |
| 7,386,839 B1 | 6/2008 | Golender et al. | |
| 7,707,568 B2 | 4/2010 | Kawahito et al. | |

(Continued)

FOREIGN PATENT DOCUMENTS

JP        7021032        1/1995

(Continued)

OTHER PUBLICATIONS

Leung et al. "Improving the Performance of Runtime Parallelization", 1993, pp. 83-91.*

(Continued)

*Primary Examiner* — Isaac Tecklu
(74) *Attorney, Agent, or Firm* — Schmeiser, Olsen & Watts; John Pivnichny

(57) ABSTRACT

A method and apparatus for optimizing a target program including a pattern of instructions to be replaced. The method is performed by execution of program code by a processor of an information processing apparatus that includes an output device and a computer readable storage medium storing the program code. At least one transformation is performed on the target program to generate a transformed target subprogram in which dependencies among the instructions included in the target subprogram are matched with dependencies in the pattern to be replaced. The transformed target subprogram is replaced, with a post-replacement instruction stream determined to correspond to the pattern to be replaced, to generate a replaced target subprogram. An optimized target program that includes the replaced target subprogram is outputted to the output device. The at least one transformation includes a first transformation, a loop transformation, or both the first transformation and the loop transformation.

20 Claims, 20 Drawing Sheets

U.S. PATENT DOCUMENTS

| | | | |
|---|---|---|---|
| 2002/0120923 A1 | 8/2002 | Granston et al. | |
| 2002/0147969 A1 | 10/2002 | Lethin et al. | |
| 2003/0101441 A1* | 5/2003 | Harrison et al. | 717/152 |
| 2005/0108695 A1 | 5/2005 | Li et al. | |
| 2005/0246700 A1* | 11/2005 | Archambault et al. | 717/156 |
| 2005/0268293 A1 | 12/2005 | Kawahito et al. | |
| 2006/0200811 A1* | 9/2006 | Cheng | 717/144 |
| 2009/0007086 A1 | 1/2009 | Kawahito et al. | |

FOREIGN PATENT DOCUMENTS

| | | |
|---|---|---|
| JP | 2000284970 | 10/2000 |
| JP | PUPA2005-339021 | 12/2005 |

OTHER PUBLICATIONS

Li et al. "Efficient Interprocedural Analysis for Program Parallelization and Restructuring", 1988, pp. 85-99.*

James Jianghai Fu; Directed Graph Pattern Matching and Topological Embedding; Journal of Algorithms 22; Article No. AL960818; Feb. 1997; pp. 372-391.

Steven S. Muchnick; Advanced Compiler Design Implementation; Morgan Kaufmann Publishers, Inc., 1997; pp. 692-694.

http://publibz.boulder.ibm.com/epubs/pdf/dz9zr002.pdf Kazuo I Kondoh/Japan/IBM Oct. 19, 2006.

Shudo et al., Cost-Effective Compilation Techniques for Java Just-in-Time Compilers, System and Computers in Japan, John Wiley & Sons, Inc., vol. 35, Issue 12, pp. 10-24, Nov. 2004.

Gupta, et al., Finding Largest Subtrees and Smallest Supertrees, Algorithmica, vol. 21, No. 2, 27 pages, 1995.

Kennedy, et al., Maximizing Loop Parallelism and Improving Data Locality via Loop Fusion and Distribution, 1993, 20 pages.

Hoover, et al., Generating Machine Specific Optimizing Compilers, ACM, 1996 St. Petersburg FL, pp. 219-229.

Cooper, et al., Enhanced Code Compression for Embedded RISC Processors, PLDI '99 (1999), 12 pages.

Davidson, et al., Quick Compilers using Peephole Optimization, Software Practice and Experience, vol. 19, No. 1 (Jan. 1989), 22 pages.

Office Action (Mail Date Feb. 23, 2009) for U.S. Appl. No. 11/133,897, Filed May 20, 2005, GAU 2193, Confirmation No. 9504.

Amendment filed May 22, 2009 in response to Office Action (Mail Date Feb. 23, 2009) for U.S. Appl. No. 11/133,897, Filed May 20, 2005, GAU 2193, Confirmation No. 9504.

Final Office Action (Mail Date Aug. 10, 2009) for U.S. Appl. No. 11/133,897, Filed May 20, 2005, GAU 2193, Confirmation No. 9504.

Amendment after Final and Request for Continued Examination filed Nov. 10, 2009 in response to Final Office Action (Mail Date Aug. 10, 2009) for U.S. Appl. No. 11/133,897, Filed May 20, 2005, GAU 2193, Confirmation No. 9504.

Notice of Allowance (Mail Date Dec. 8, 2009) for U.S. Appl. No. 11/133,897, Filed May 20, 2005, GAU 2193, Confirmation No. 9504.

Office Action (Mail Date Dec. 22, 2011) for U.S. Appl. No. 12/167,421, Filed Jul. 3, 2008, GAU 2191, Confirmation No. 5458.

* cited by examiner

```
1: while(true) {
2:    if(booltable(v0[v1]))break;
3:    v1++;
4: }
```

30

```
1:  < PREPARE TABLE USED FOR TRT >
2:  R1 = bytearray + i;
3:  while (true) {
4:      if (i+256 <= bytearray. length) {
5:          TRT 0(256, R1), 0(table) // TRT INSTRUCTION
6:          if (nothing is found) {
7:              R1 += 256;
8:              i += 256;
9:          } else {
10:             i = R1 - bytearray;
11:             ch = load byte from R1;
12:             if (cond1) {
13:                 < PROCESSING CORRESPONDING TO COND1 >
14:             } else if (cond2) {
15:                 < PROCESSING CORRESPONDING TO COND2 >
16:             } else .....
17:             } else if (condN) {
18:                 < PROCESSING CORRESPONDING TO CONDN >
19:             }
20:         }
21:     } else {
22:         // EXECUTE ORIGINAL LOOP
23:     }
24: }
```

```
1: byte ch;
2: while (true) {
3:     i++;
4:     ch=a[i];
5:     if(0x20>ch || ch== '<')break;
6: }
7:  // VARIABLE CH IS REFERRED TO AFTER THIS LOOP PROCESSING
```

FIG. 5a

```
1: byte ch;
2: i++;            // DUPLICATED BEGINNING SECTION
3: while (true) {
4:     ch=a[i];    // CHANGED BEGINNING SECTION OF LOOP PROCESSING
5:     if(0x20>ch || ch== '<')break;
6:     i++;
7: }
```

```
1: byte ch;
2: i++;           // DUPLICATED BEGINNING SECTION
3: while (true) {
4:     ch=a[i];   // CHANGED BEGINNING SECTION OF LOOP PROCESSING
5:     if(0x20>ch || ch== '<')break;
6:     i++;
7: }
8: ch=a[i];       // DUPLICATED FIRST INSTRUCTION
```

FIG. 8b

OPTIMIZATION OF A TARGET PROGRAM

FIELD OF THE INVENTION

The present invention relates to an optimizing compiler. In particular, the present invention relates to a technique of a compiler for replacing an instruction stream in a program with an instruction executable at a higher speed.

BACKGROUND OF THE INVENTION

Conventionally, there has been proposed a technique for detecting, from a program subjected to optimization, an instruction stream which agrees with a predetermined pattern, and then replacing the instruction stream with another instruction stream determined correspondingly to the pattern. According to this technique, a program, for example, can be optimized by replacing a series of instructions, which realizes certain processing, with a single instruction which produces the same processing result as the certain processing. As an example of an instruction with which such a series of instructions is replaced, a TRT instruction in the S/390 architecture of IBM Corporation can be given.

The TRT instruction is an instruction for scanning a predetermined memory area sequentially from the beginning of the area, and for outputting an address or the like where a value satisfying a predetermined condition is stored. FIG. 15 is a control flow graph corresponding to processing performed by the TRT instruction. The processing performed by the TRT instruction corresponds to a series of processing of: reading out values stored in a memory area into a variable ch by looping through steps (1), (2), and (3) of each iteration of the loop sequentially from the beginning of the memory area bytearray with memory area index "i" being incremented by 1 at the end of each iteration in step (3) to reference the next sequential memory area location, namely bytearray [i], in step (1) of the next iteration; and terminating the processing via step (2) when a value of the variable ch satisfies any one of conditions cond1 to condN. A compiler can optimize a program by replacing the series of processing as described here with the single TRT instruction.

Reference documents are listed below. Non-patent Documents 1 and 2 will be referred to in embodiments.

However, a program subjected to optimization rarely agrees completely with a predetermined pattern. Conventionally, optimization has been given up in such a case. As a result, there are cases where an instruction uniquely supported by an architecture such as the TRT instruction cannot be effectively utilized.

Thus, there is a need for a program optimization that enables an architecture such as the TRT instruction to be effectively utilized.

SUMMARY OF THE INVENTION

The present invention provides a method for optimizing a target program comprising a pattern to be replaced, said pattern comprising instructions, said method being performed by execution of program code by a processor of an information processing apparatus that comprises a computer readable storage medium and an output device, said program code stored on the computer readable storage medium, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

The present invention provides an information processing apparatus comprising a processor, a computer readable storage medium, and an output device, said storage medium comprising program code configured to be executed by the processor to implement a method for optimizing a target program comprising a pattern to be replaced, said pattern comprising instructions, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

The present invention provides a computer program product, comprising a computer readable storage medium having program code stored therein, said program code configured to be executed by a processor of an information processing apparatus to implement a method for optimizing a target program comprising a pattern to be replaced, said pattern comprising instructions, said information processing apparatus comprising a computer readable storage medium and an output device, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

BRIEF DESCRIPTION OF THE DRAWINGS

FIG. 4 shows one example of a post-replacement instruction template, in accordance with embodiments of the present invention.

FIG. 5a shows one example of a target subprogram, in accordance with embodiments of the present invention.

FIG. 7b shows a pseudocode of the target subprogram transformed by the loop transforming unit, in accordance with embodiments of the present invention.

FIG. 8b shows a pseudocode of the target subprogram which is a result of having the target subprogram transformed by the second transformation unit, in accordance with embodiments of the present invention.

DETAILED DESCRIPTION OF THE INVENTION

Figure 1:
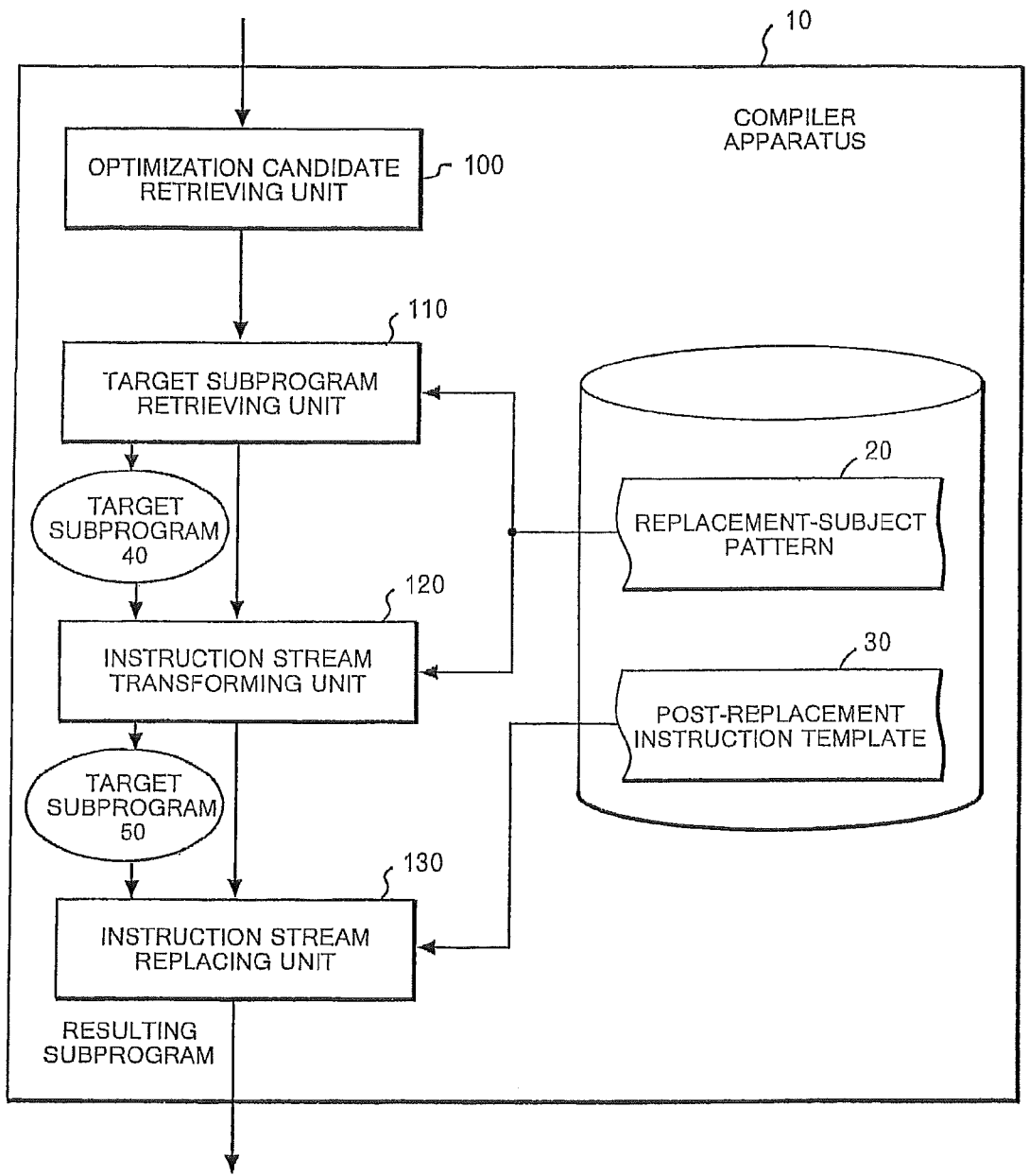
FIG. 1 shows a compiler apparatus, in accordance with embodiments of the present invention.

FIG. 1 shows a compiler apparatus 10, in accordance with embodiments of the present invention. The compiler apparatus 10 includes an optimizing candidate retrieving unit 100, a target subprogram retrieving unit 110, an instruction stream transforming unit 120 and an instruction stream replacing unit 130. The compiler apparatus 10 retrieves an instruction stream corresponding to a pattern to be replaced having a plurality of predetermined instructions, and replaces the retrieved instruction stream with a post-replacement instruction stream determined correspondingly to the pattern to be replaced. The post-replacement instruction stream is an instruction stream executed at a higher speed than the pattern to be replaced, and examples of the post-replacement instruction stream include a high-speed instruction unique to an architecture. In other words, the compiler apparatus 10 is intended to optimize a target program by replacing at least a part thereof into an instruction stream executed at a higher speed.

The compiler apparatus 10 is provided with the optimizing candidate retrieving unit 100, the target subprogram retrieving unit 110, the instruction stream transforming unit 120 and the instruction stream replacing unit 130 all of which are realized by operations of a central processing unit (CPU) 1500 and a random access memory (RAM) 1520 (hereinafter, referred to simply as the memory). CPU 1500 and RAM 1520 are described infra in conjunction with FIG. 14. The optimizing candidate retrieving unit 100 retrieves, by operation of the CPU 1500, a subprogram candidate to be optimized. As the subprogram, the optimizing candidate retrieving unit 100 may retrieve an instruction stream in the form of a processing unit of programs which is called a method, a function or a procedure, or may retrieve an instruction stream determined according to a nature of a control flow as in the case with loop processing or the like.

Then, the target subprogram retrieving unit 110 retrieves a subprogram similar to a pattern to be replaced as a target subprogram 40, from a plurality of subprograms retrieved by the optimizing candidate retrieving unit 100. For example, the target subprogram retrieving unit 110 retrieves a subprogram having instructions corresponding to all the instructions contained in the pattern to be replaced 20 by operations of the CPU 1500, and stores the retrieved subprogram as the target subprogram 40 to be optimized in the memory. More specifically, the target subprogram retrieving unit 110 determines that two instructions, each contained in the pattern to be replaced 20 and subprogram, correspond to each other only when the two instructions satisfy all of the following conditions. Firstly, contents of processing of the two instructions are the same. Secondly, the numbers of control flows outputted from these instructions are the same. Thirdly, instructions to which the control flows move from the two instructions are the same. The processing of retrieving a subprogram similar to the pattern to be replaced 20 will be later described further in detail with reference to FIG. 12.

The instruction stream transforming unit 120 receives as input the target subprogram 40 which had been outputted by the target subprogram retrieving unit 110. The instruction stream transforming unit 120 performs a transformation to match dependencies among the instructions contained in the target subprogram 40 with those in the pattern to be replaced 20. The transformation is performed, within the target subprogram 40 contained in the memory, on instructions other than those corresponding to the instructions contained in the pattern to be replaced 20, and also on instructions having dependencies of execution different from those in the pattern to be replaced 20. The instruction stream transforming unit 120 may perform a transformation on any other instruction if necessary. The target subprogram thus transformed is set as the target subprogram 50.

The instruction stream replacing unit 130 receives as input the target subprogram 50 which had been outputted by the instruction stream transforming unit 120. The instruction stream replacing unit 130 replaces, by operations of the CPU 1500, the target subprogram 50 with the post-replacement instruction stream determined to correspond to the pattern to be replaced 20. The replacement is done on condition that dependencies among instructions in the pattern to be replaced 20 and the target subprogram 50 obtained by the transformation by the instruction stream transforming unit 120 are matched with each other. For example, the instruction stream replacing unit 130 may generate the post-replacement instruction stream by replacing each of variables in a post-replacement instruction template 30, which indicates a structure of the post-replacement instruction stream, with a variable contained in the target subprogram 50 corresponding to the variables. The target program containing the post-replacement instruction stream is outputted to an output device of the an information processing apparatus 500 (see FIG. 14 and a description infra thereof) with being included in the optimized target program.

Figure 2:
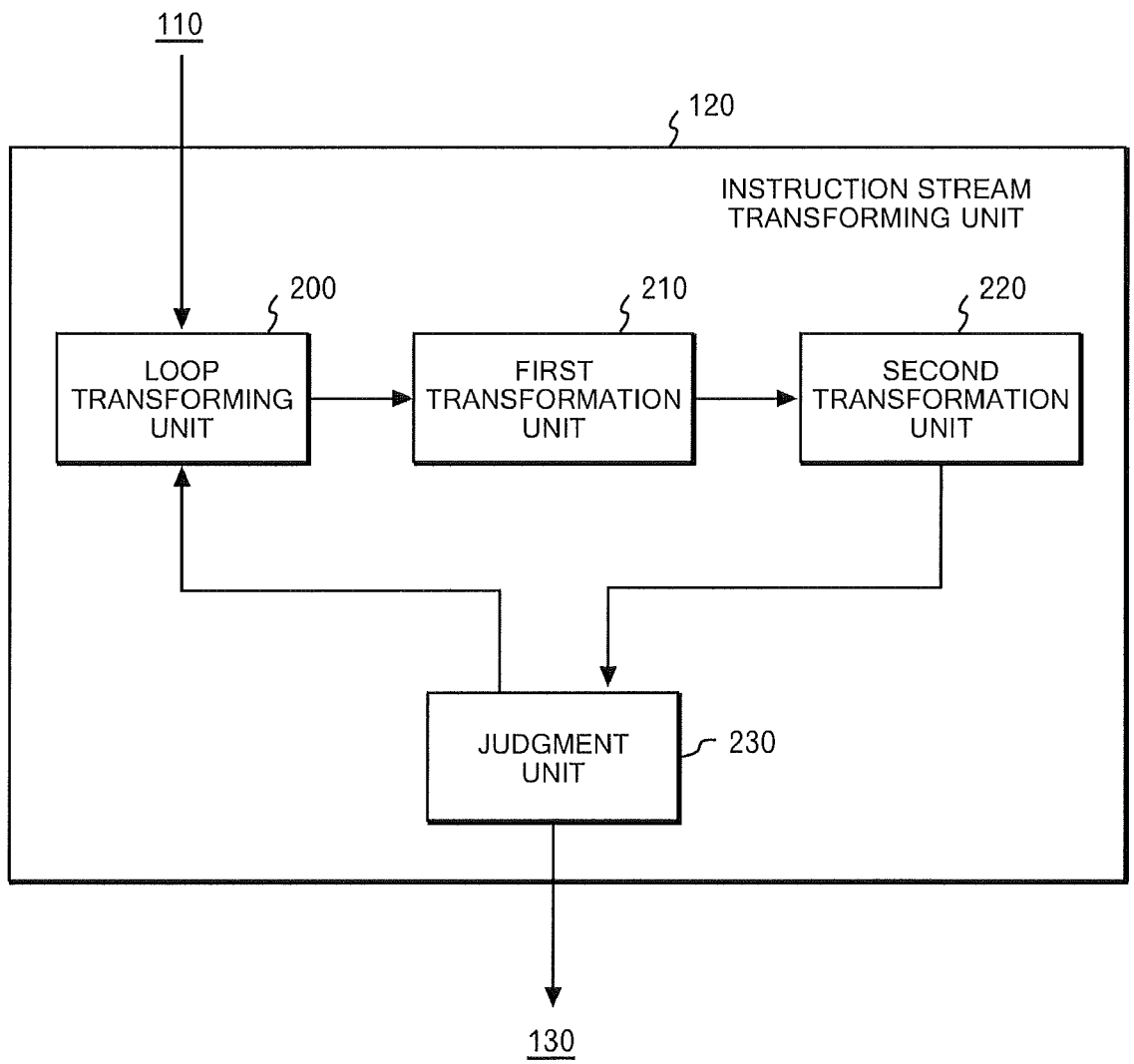
FIG. 2 shows a functional configuration of an instruction stream transforming unit of FIG. 1, in accordance with embodiments of the present invention.

FIG. 2 shows a functional configuration of an instruction stream transforming unit 120 of FIG. 1, in accordance with embodiments of the present invention. The instruction stream transforming unit 120 includes a loop transforming unit 200, a first transformation unit 210, a second transformation unit 220, and a judgment unit 230. The loop transforming unit 200 reads out the target subprogram 40 stored in the memory, and performs processing of changing phases of instruction execution when loop processing is regarded as cyclic execution of a plurality of instructions. Specifically, the loop transforming unit 200 duplicates some instructions contained in the target subprogram 40 and executed at the beginning of loop processing to a part executed prior to the start of the loop processing. Then, the loop transforming unit 200 moves only the other instructions to the beginning of the loop processing, and thereafter moves the duplicated instructions subsequent to the other instructions in the loop processing. Thereby, the loop transforming unit 200 can match the dependencies among the instructions contained in the target subprogram 40 with those in the pattern to be replaced 20. What range of instructions from the beginning of the loop processing is duplicated is determined according to the instruction at the beginning of loop processing in the pattern to be replaced. The instructions thus transformed are stored in the memory.

Next, the first transformation unit 210 matches the dependencies among the instructions contained in the target subprogram 40 with those in the pattern to be replaced 20 by performing a transformation of moving an instruction executed prior to a conditional branch instruction to each of branch destinations of the conditional branch instruction by operations of the CPU 1500. This transformation is realized by changing a data flow function for retrieving a range to which the instructions can be moved within a range where the data dependencies can be retained according to the dependencies among the instructions in the pattern to be replaced 20.

Subsequently, a transformation by the second transformation unit 220 is tried on conditions that the pattern to be replaced 20 contains, in loop processing, a first instruction for assigning an operation result to a variable, and that the pattern to be replaced 20 contains an instruction for referring to a content of the variable in a part executed subsequently to the loop processing. The second transformation unit 220 reads out, from the memory, the target subprogram 40 thus transformed. Then, by operations of the CPU 1500, the second transformation unit 220 performs a transformation of inserting the first instruction to a part executed if a termination condition of the loop processing is satisfied.

The judgment unit 230 judges whether the dependencies among the instructions contained in the target subprogram 40 are matched with those in the pattern to be replaced 20. At the judgment, whether or not dependencies among instructions are matched between the target subprogram 40 and the pattern to be replaced 20 is judged excluding the first instruction for assigning a value into the variable which is not referred to in parts other than the loop processing as a result of the transformation. When they are not matched, the judgment unit 230 informs the loop transformation unit 200 of the judgment result so as to allow the transformed target subprogram 40 to be further transformed by the loop transforming unit 200, the first transformation unit 210 and the second transformation unit 220. Note that, even when they are not matched, the judgment unit 230 may terminate processing by assuming that the transformations have ended in failure. Such a course of action is taken in a case where the transformation result by the loop transforming unit 200, the first transformation unit 210 and the second transformation unit 220 is the same as previous transformation result performed by the loop transforming unit 200, the first transformation unit 210 and the second transformation unit 220. When they are matched, the judgment unit 230 outputs the target subprogram thus transformed to the instruction stream replacing unit 130.

Note that the order in which the respective steps of the transformation processing shown in this drawing are applied, and the number of times each step thereof is applied are given as one example. In other words, the instruction stream transforming unit 120 may change the order in which it performs the transformations using the loop transforming unit 200, the first transformation unit 210 and the second transformation unit 220. Additionally, although the number of times each of the transformations is performed for each judgment made by the judgment unit 230 is once in FIG. 2, the number of transformations may be twice or more. Furthermore in one embodiment, the instruction stream transforming unit 120 may not change the target subprogram directly. To be more precise, each of the transformations using the respective functions shown in FIG. 2 has a risk of reducing a processing speed of the target program as a whole in a case where the transformations is judged as a failure. For this reason, the instruction stream transforming unit 120 performs the abovementioned processing on the duplicate program after duplicating the target subprogram 40 to generate a duplicate program thereof. Note that, in order to facilitate analysis, it is desirable for the duplicate program to be provided to subsequent processing after being transformed into a dependency graph having instructions and dependencies of execution as nodes and directed edges, respectively. Then, the instruction stream transforming unit 120 overwrites the target subprogram 40 with the duplicate program when the transformations have ended successfully. The instruction stream transforming unit 120 does not change but maintains the target subprogram 40 when the transformations end in failure. Thus, resulting codes can be selectively used depending on whether the transformations end successfully or in failure.

Figure 3A:
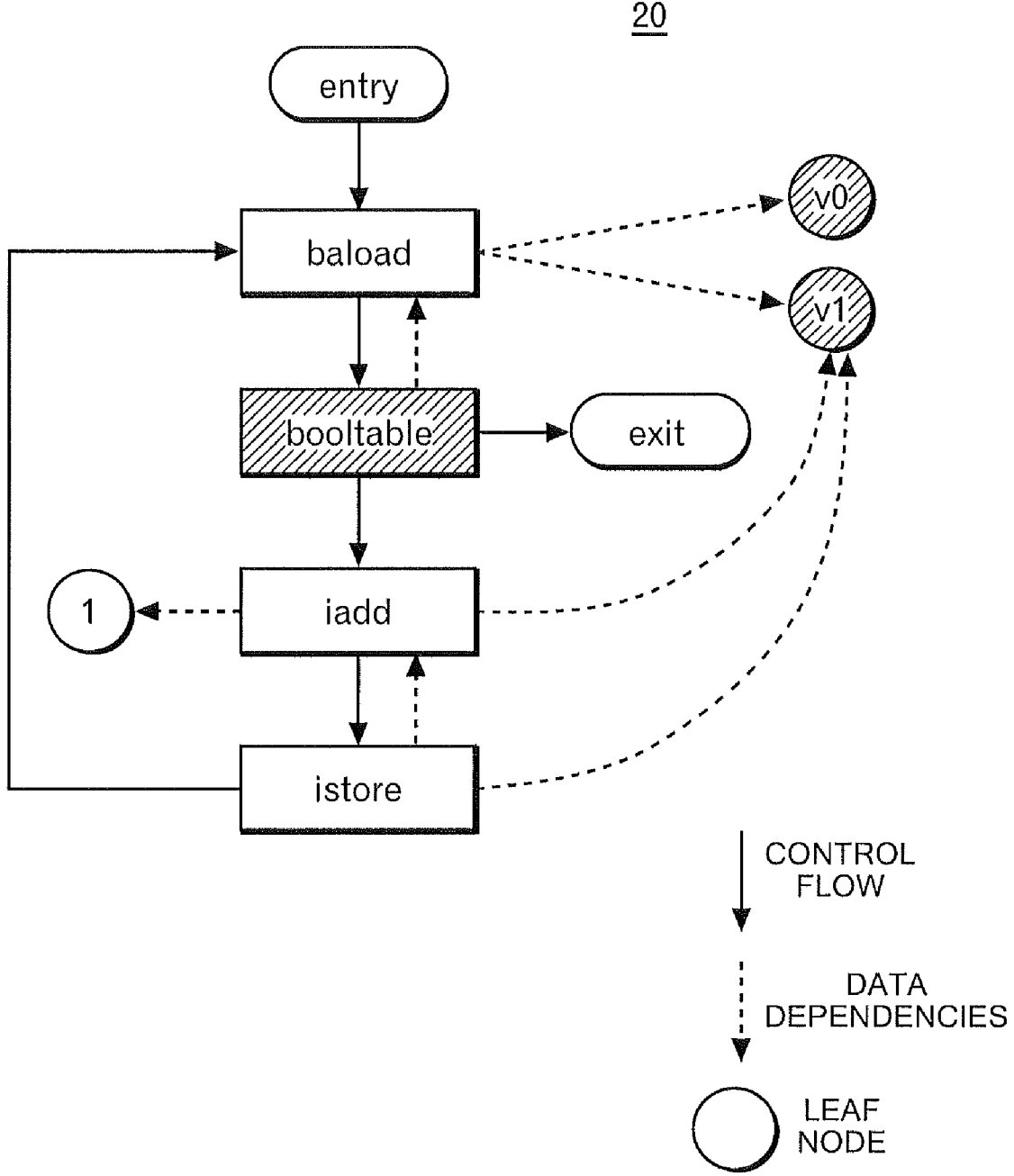
FIG. 3a shows a graphic expression of a pattern to be replaced, in accordance with embodiments of the present invention.
Figures 3B, 3C:
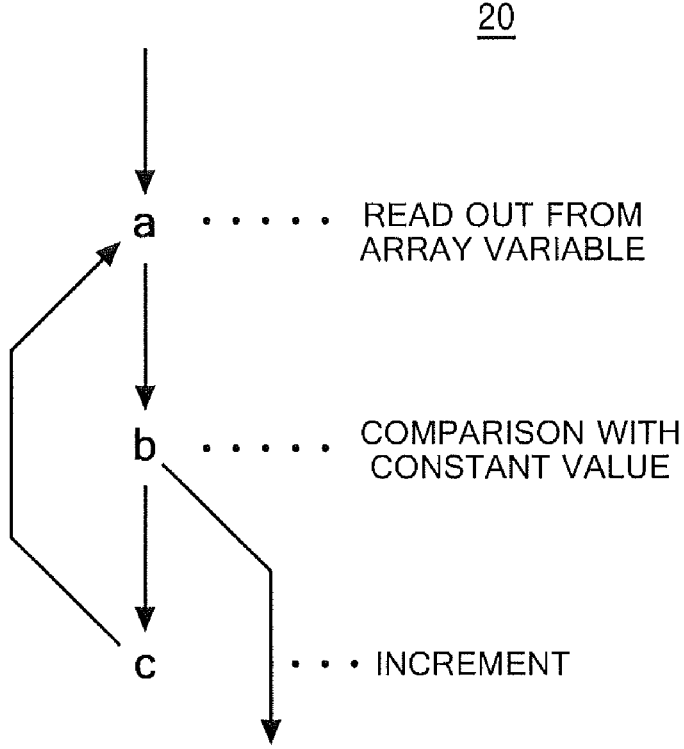
FIG. 3b shows a simplified graphic expression of the pattern to be replaced of FIG. 3a, in accordance with embodiments of the present invention.
FIG. 3c shows a pseudocode indicating processing contents of the pattern to be replaced of FIG. 3a, in accordance with embodiments of the present invention.

FIG. 3a shows a graphic expression of a pattern to be replaced 20, FIG. 3b shows a simplified graphic expression of the pattern to be replaced 20, and FIG. 3c shows a pseudocode indicating processing contents of the pattern to be replaced 20, in accordance with embodiments of the present invention. Directed edges in solid lines in FIG. 3a represent a control flow, and directed edges in dotted lines therein represent data dependencies. Additionally, an instruction baload in FIG. 3a corresponds to a symbol a in FIG. 3b, an instruction booltable in FIG. 3a corresponds to a symbol b in FIG. 3b, and instructions iadd and istore in FIG. 3a correspond to a symbol c in FIG. 3b. Additionally, a variable v0, which is a first variable, represents an address which becomes a starting point of scanning, and a variable v1, which is a second variable, represents an offset value of a scanning position.

This pattern to be replaced 20 contains a read-out instruction (baload) at the beginning of loop processing. This read-out instruction reads out data from the memory at an address obtained by adding the offset value given as a value of the variable v1 to an address given as a value of the variable v0. Additionally, the pattern to be replaced 20 contains a conditional branch instruction (booltable). The conditional branch instruction compares the read-out data with a constant value, and branches to instruction execution outside the loop processing according to a result of the comparison. This conditional branch instruction (booltable) acts as a wild card in the comparison of the pattern to be replaced 20 with the target subprogram 40, and can correspond to at least one conditional branch instruction in the target subprogram 40. The read-out instruction and the conditional branch instruction described above correspond to the second line in FIG. 3c.

Additionally in FIG. 3c, the pattern to be replaced 20 contains instructions for incrementing the value of the variable v1 (iadd), for thereafter storing the incremented value in an area on the memory corresponding to the variable v1 (istore), and for returning processing back to the beginning of the loop processing. Returning processing back to the beginning of the loop processing is executed if a condition in the conditional branch instruction is not satisfied. The instructions in FIG. 3c not including the conditional branch corresponds to the first, third and fourth lines in FIG. 3c.

As has been described above, in a case where dependencies among instructions are matched with those shown in FIG. 3a, the instructions become replaceable with an instruction stream which contains the TRT instruction and is executable at a higher speed. However, when the target subprogram 40 is maintained without any transformation performed thereon, the dependencies among the instructions therein are not matched with those in FIG. 3a in some cases.

FIG. 4 shows one example of a post-replacement instruction template 30, in accordance with embodiments of the present invention. Note that this drawing shows a program source code indicating processing contents performed by instructions contained in the post-replacement instruction template 30. The post-replacement instruction template 30 may be written in a predetermined intermediate code or machine language. In the post-replacement instruction template 30, a variable bytearray indicates an address of a memory area in which values subjected to comparison performed by the TRT instruction are stored. Additionally, a variable i indicates an index used for scanning the memory area. With reference to FIG. 4, description will be given of an example of processing of replacing, with the post-replacement instruction stream, the target subprogram 40 if dependencies among the instructions are matched with those in the pattern to be replaced 20.

The instruction stream replacing unit 130 generates, in the first line, an instruction for securing a memory area of a table (table) used for the TRT instruction according to at least one conditional branch instruction in the target subprogram 40 matched with the conditional branch instruction (booltable) in the pattern to be replaced 20. By using, as an index, a constant value subjected to comparison in condition judgment, this table stores a logical value of 1 in an area specified by the index, and stores logical values of 0 in the other areas. Additionally, the instruction stream replacing unit 130 replaces the variable bytearray in the post-replacement instruction template 30 with a variable contained in the target subprogram 40 and corresponding to the variable v0 in the pattern to be replaced 20. Moreover, the instruction stream replacing unit 130 replaces the index i in the post-replacement instruction template 30 with a variable contained in the target subprogram 40 and corresponding to the variable v1 in the pattern to be replaced 20. Furthermore, the instruction stream replacing unit 130 replaces the twelfth to nineteenth lines in the post-replacement instruction template 30 with an instruction stream contained in the target subprogram 40 and executed on condition that data in the memory agrees with the constant value.

Through the above replacement processing, the subprogram 40 is replaced with an instruction stream containing the TRT instruction which sequentially scans a memory starting from an address given as the value of the variable v0, and outputs an address where data matching with any one of preset constant values is stored. According to processing performed by this instruction stream, an area which is on the memory and which is specified by the variable v0 is compared with the constant values collectively for every 256 bytes. Then, a suffix is incremented by 256 when the area does not match with any one of the constant values. When the area matches with any one of the constant values, execution is shifted to an instruction stream outside loop processing. Additionally, an area of a broken size smaller than 256 bytes is compared to an instruction stream before the optimization in the twenty second line.

Figure 5B:
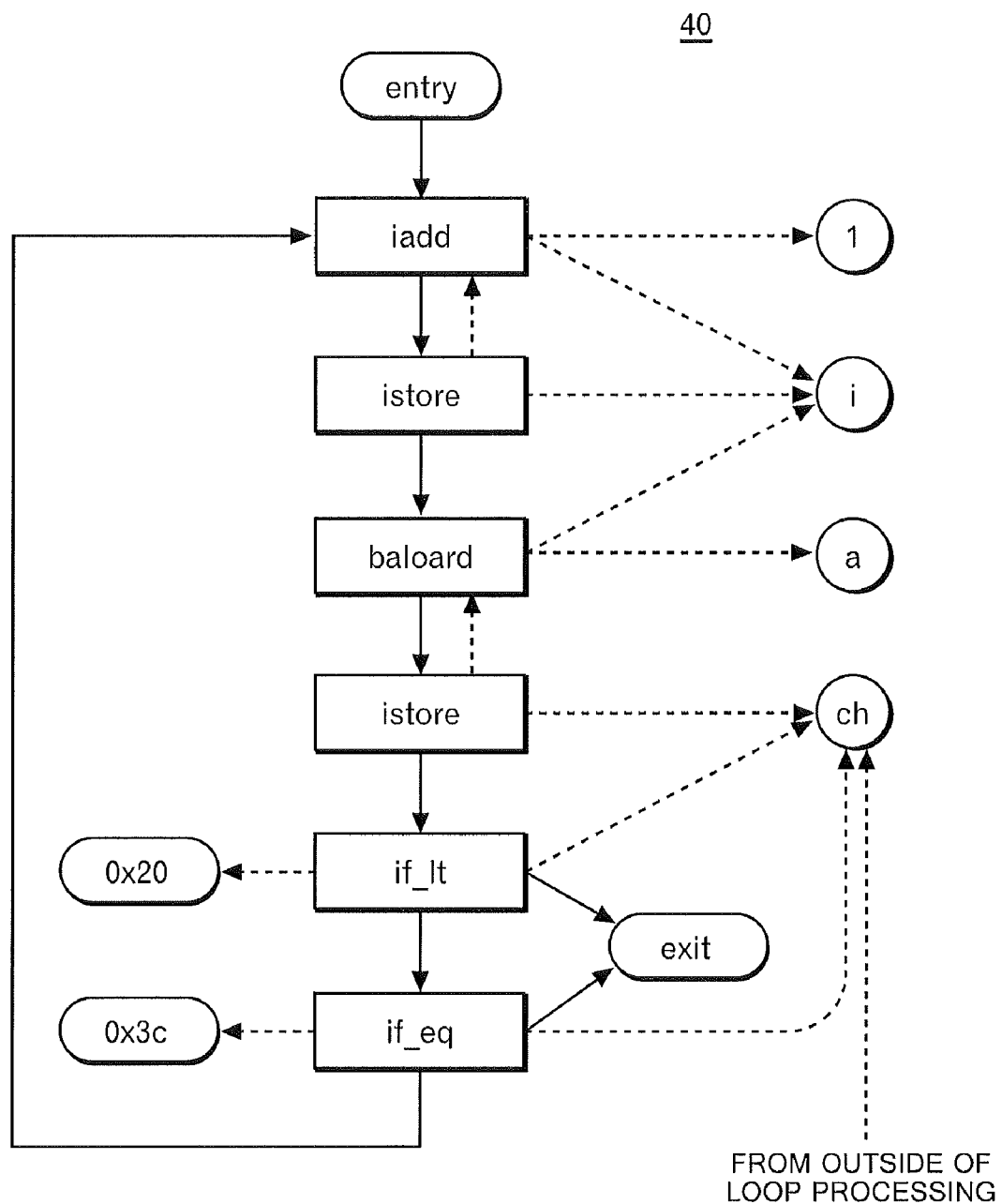
FIG. 5b shows a graphic expression of the target subprogram of FIG. 5a, in accordance with embodiments of the present invention.

FIG. 5a shows an example of a target subprogram 40, and FIG. 5b shows a graphic expression of the target subprogram 40, in accordance with embodiments of the present invention. The subprogram 40 is, for example, a fragment of an instruction stream written in a Java® language. Within loop processing shown in the second to sixth lines in FIG. 5a, a variable is incremented first. This processing depends on a constant of 1 and the variable i as shown in FIG. 5b. Thereafter, as shown in the fourth line in FIG. 5a, data is read out into a variable ch from an address obtained by adding an offset value indicated by the variable i to an address indicated by the variable a. This processing depends on the variables a and ch as shown in FIG. 5b. Then, the data is compared with a constant value of 0x20 and with '<'. Note that, because the symbols ' ' indicate an operator calculating a character code, '<' indicates a constant value of 0x3 denoting a character code of the character <. This comparison processing depends on the variable ch and constant values corresponding thereto. If any one of conditions is satisfied, the loop processing is ended. Note that, this variable ch is referred to also after the loop processing is ended.

Figure 5C:
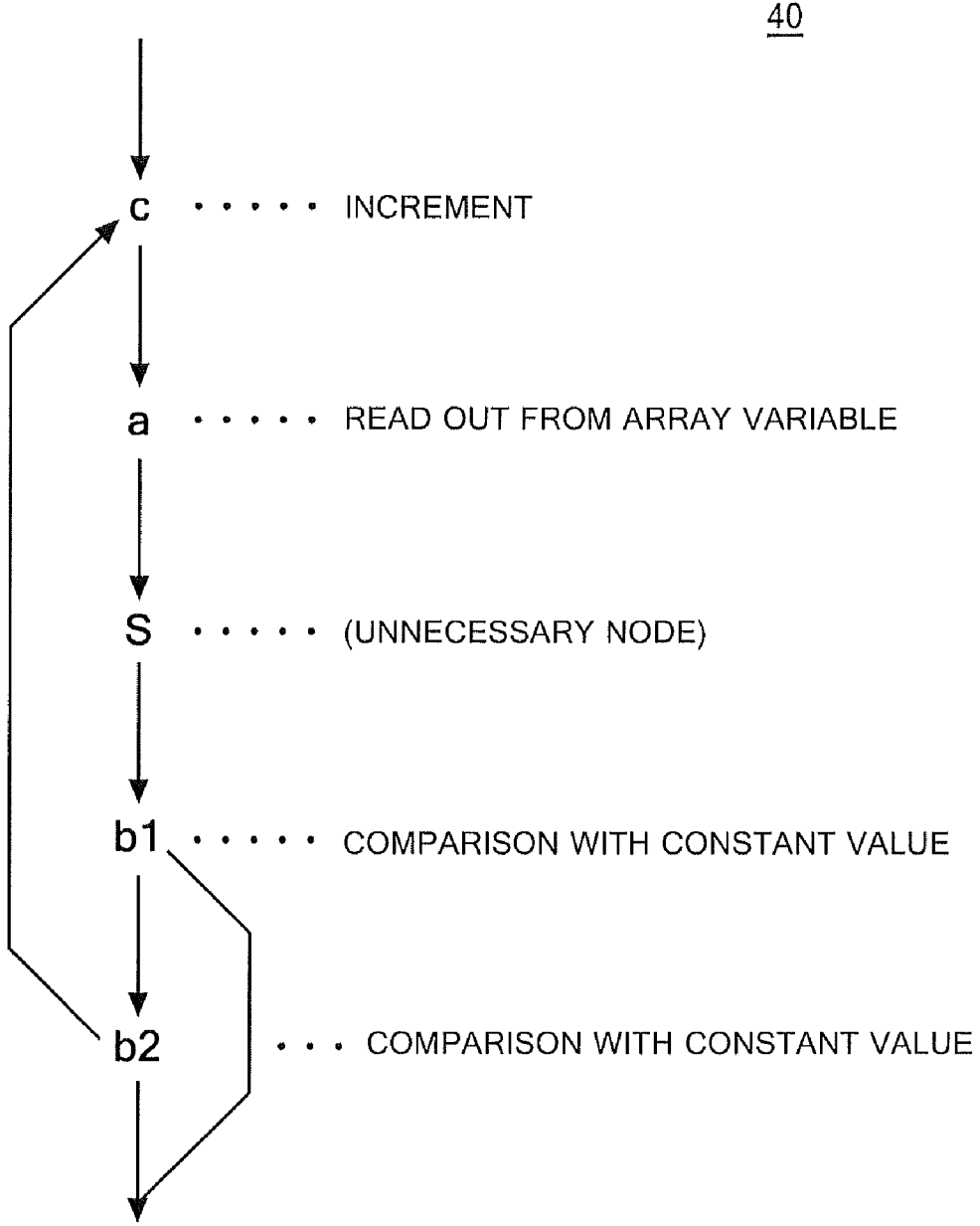
FIG. 5c shows a simplified graphic expression of the target subprogram, in accordance with embodiments of the present invention.

FIG. 5c shows a simplified graphic expression of the target subprogram 40. Because the symbols a and c are shown in FIG. 3b, description thereof will be skipped. Symbols b1 and b2 collectively correspond to the symbol b shown in FIG. 3b. On the other hand, a symbol S corresponds to an instruction for storing a value of the variable ch in the memory. This instruction is not contained in the pattern to be replaced 20. Additionally, while the symbols are arranged in the order of c, a, and b in the target subprogram 40, they are arranged in the order of a, b, and c in the pattern to be replaced 20. For this reason, the target subprogram 40 as it is cannot be replaced with the post-replacement instruction stream. So as to make the subprogram 40 replaceable, the loop transforming unit 200, first, tries to transform the instruction stream.

Figure 6:
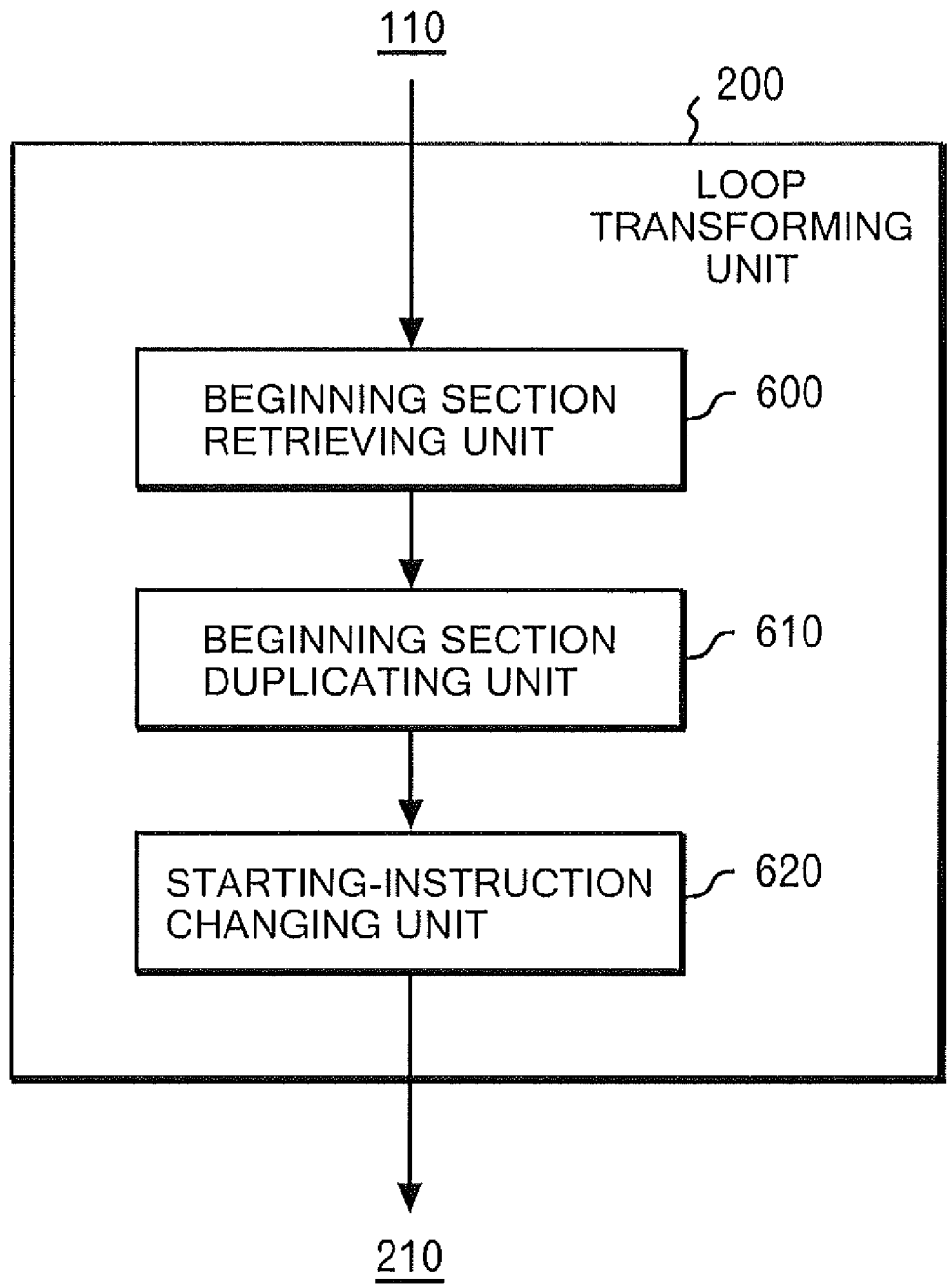
FIG. 6 shows a functional configuration of a loop transforming unit, in accordance with embodiments of the present invention.

FIG. 6 shows a functional configuration of a loop transforming unit 200, in accordance with embodiments of the present invention. The loop transforming unit 200 includes a beginning section retrieving unit 600, a beginning section duplicating unit 610, and a starting-instruction changing unit 620. By operations of the CPU 1500, the beginning section retrieving unit 600 scans each of the instructions in the target subprogram 40 to retrieve a beginning section of loop processing. After retrieving the beginning section of loop processing, the beginning section retrieving unit 600 continues sequentially scanning the instructions, and retrieves instructions corresponding to the beginning of loop processing in the pattern to be replaced 20 from the beginning section thus retrieved. In the example in FIG. 5c, the beginning section retrieving unit 600 detects the instructions from the instruction of the symbol c to the instruction of the symbol a as the instructions corresponding to the beginning of the loop processing. This scanning processing is realized by reading out instruction streams in the target subprogram 40 sequentially along the control flows. The target subprogram 40 and a result of the scanning are outputted to the beginning section duplicating unit 610.

Next, by operations of the CPU 1500, the beginning section duplicating unit 610 duplicates instructions (only the symbol c in the example of FIG. 5c) each scanned by the beginning section retrieving unit 600, except the instructions corresponding to the beginning of the loop processing in the pattern to be replaced 20. The beginning section duplicating unit 610 inserts the duplicated instructions into a part which is in the target subprogram 40, and is executed prior to the start of the loop processing. Then, by operations of the CPU 1500, the starting-instruction changing unit 620 changes these instructions at the beginning of the loop processing into the instructions contained in the target subprogram 40 and corresponding to the beginning of the loop processing in the pattern to be replaced 20. In the example in FIG. 5c, the starting-instruction changing unit 620 changes the control flows so that the symbol a can move to the beginning of the loop processing. Generation of instructions and change of control flows are realized by first securing memory areas in which the instructions are newly stored, and thereafter changing branch destination addresses of a conditional branch instruction and an unconditional branch instruction to these memory areas.

Figure 7A:
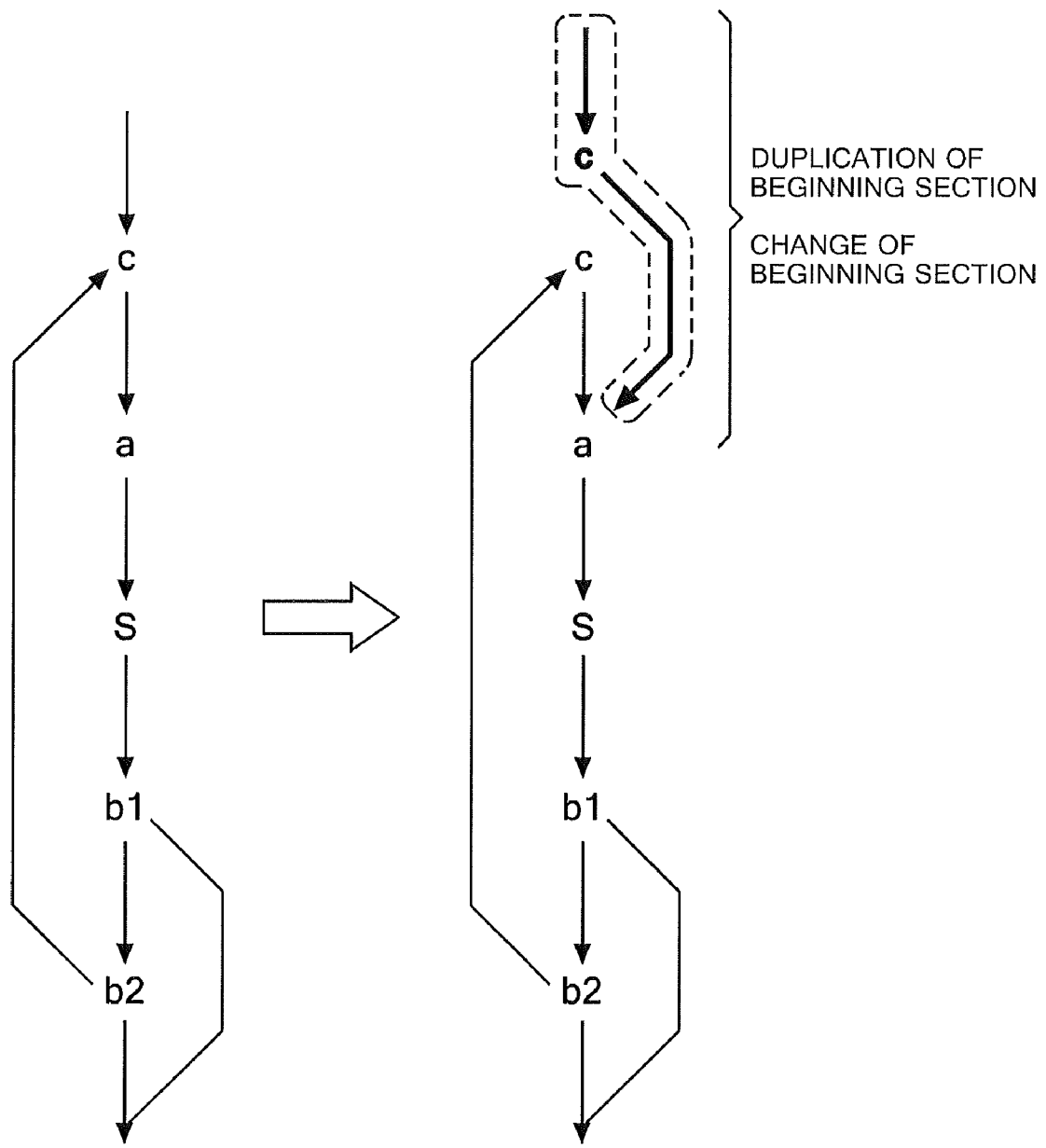
FIG. 7a shows an outline of processing in which the target subprogram is transformed by the loop transforming unit, in accordance with embodiments of the present invention.

FIG. 7a shows an outline of processing in which the target subprogram 40 is transformed by the loop transforming unit 200, in accordance with embodiments of the present invention. Because the beginning section retrieving unit 600 has detected, as a beginning section of loop processing, an instruction stream corresponding to the symbols c and a, the beginning section duplicating unit 610 duplicates the symbol c, which is an instruction excluding the symbol a among these instructions, to a part which is in the target subprogram 40 and is executed prior to the start of the loop processing. Then, the starting-instruction changing unit 620 changes the beginning of the loop processing into the instruction corresponding to the symbol a.

FIG. 7b shows a pseudocode of the target subprogram 40, transformed by the loop transforming unit 200, in accordance with embodiments of the present invention. As shown in the second line thereof, an instruction i++ is duplicated to a part executed prior to the start of the loop processing from a beginning section of loop processing. Moreover, as shown in the fourth to sixth lines, an execution order of the instructions in the loop processing becomes an order of a read-out instruction, a conditional branch instruction, and an increment instruction.

Through the above transformations, the execution order of (or control dependencies among) the instructions in the loop processing has come to be matched with that of the instructions in the pattern to be replaced 20. However, the target subprogram 40 contains an instruction (the symbol S) not existing in the pattern to be replaced 20, and therefore, still cannot be replaced with the post-replacement instruction stream. Subsequently, description will be given of an outline of a transformation performed by the second transformation unit 220 further on target subprogram 40 thus transformed. Because any transformation is not performed by the first transformation unit 210 on the transformed target subprogram 40 shown in FIG. 7b, description of processing performed by the first transformation unit 210 will be skipped here, and the processing performed by the second transformation unit 220 will be described.

Figure 8A:
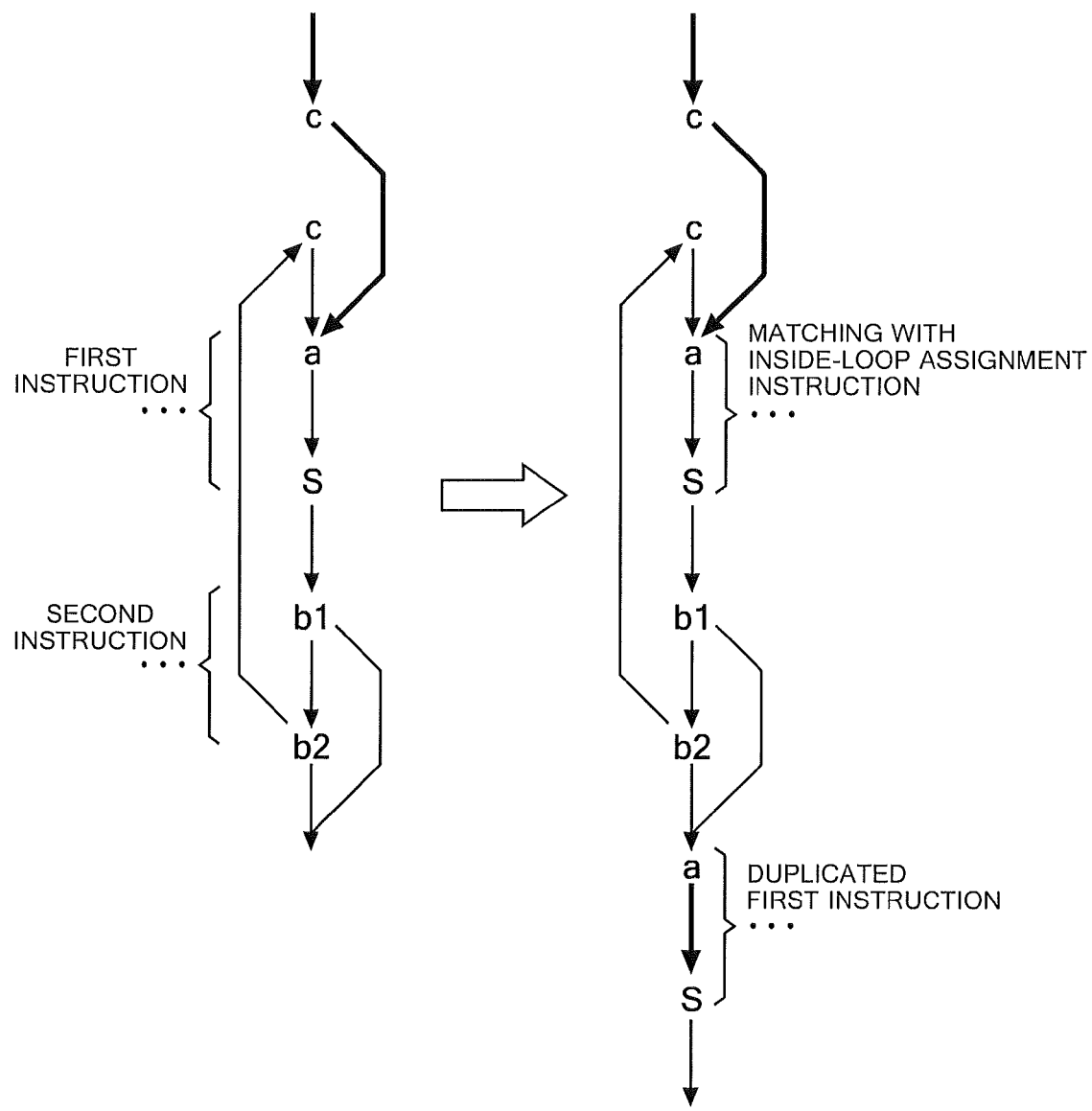
FIG. 8a shows an outline of the processing in which the target subprogram is transformed by a second transformation unit, in accordance with embodiments of the present invention.

FIG. 8a shows an outline of the processing in which the target subprogram 40 is transformed by the second transformation unit 220, in accordance with embodiments of the present invention. The target subprogram 40 transformed by the loop transforming unit 200 contains the first instruction which assigns an operation result to a variable. This first instruction is expressed by a combination of the read-out instruction for reading out from the memory and a storage instruction for storage in the memory. The read-out instruction is indicated by the symbol a, and the storage instruction is indicated by the symbol S. Here, the storage instruction indicated by the symbol S has been a cause of mismatch of the target subprogram 40 with a group of instructions in the pattern to be replaced 20. Additionally, because reference to this variable exits outside the loop processing, this storage instruction cannot be deleted even by existing optimizing processing.

In this case, the second transformation unit 220 performs a transformation of duplicating this first instruction to a part executed if a termination condition of the loop processing is satisfied. To be more precise, in the target subprogram 50 shown in the right side of FIG. 8a, the symbols a and S which indicate the duplicate of the first instruction are inserted into a part executed if a termination condition is satisfied in the second instruction indicated by the symbols b1 and b2. As a result, a variable value stored by the storage instruction indicated by the symbol S is referred to only from inside the loop processing. Consequently, this storage instruction is matched with an inside-loop assignment instruction in the pattern to be replaced 20.

FIG. 8b shows a pseudocode of the target subprogram 50 which is a result of having the target subprogram 40 transformed by the second transformation unit 220, in accordance with embodiments of the present invention. As compared with FIG. 7b, an instruction for assigning, into the variable ch, a value read out from the memory is added in the eighth line. Furthermore, while an assignment instruction in the fourth line is identical to an assignment instruction in FIG. 7b, a result of the assignment is not referred to from outside the loop processing. As a result, the second transformation 220 has been able to match the dependencies among the instructions contained in the target subprogram 40 with those in the pattern to be replaced 20.

Figure 9:
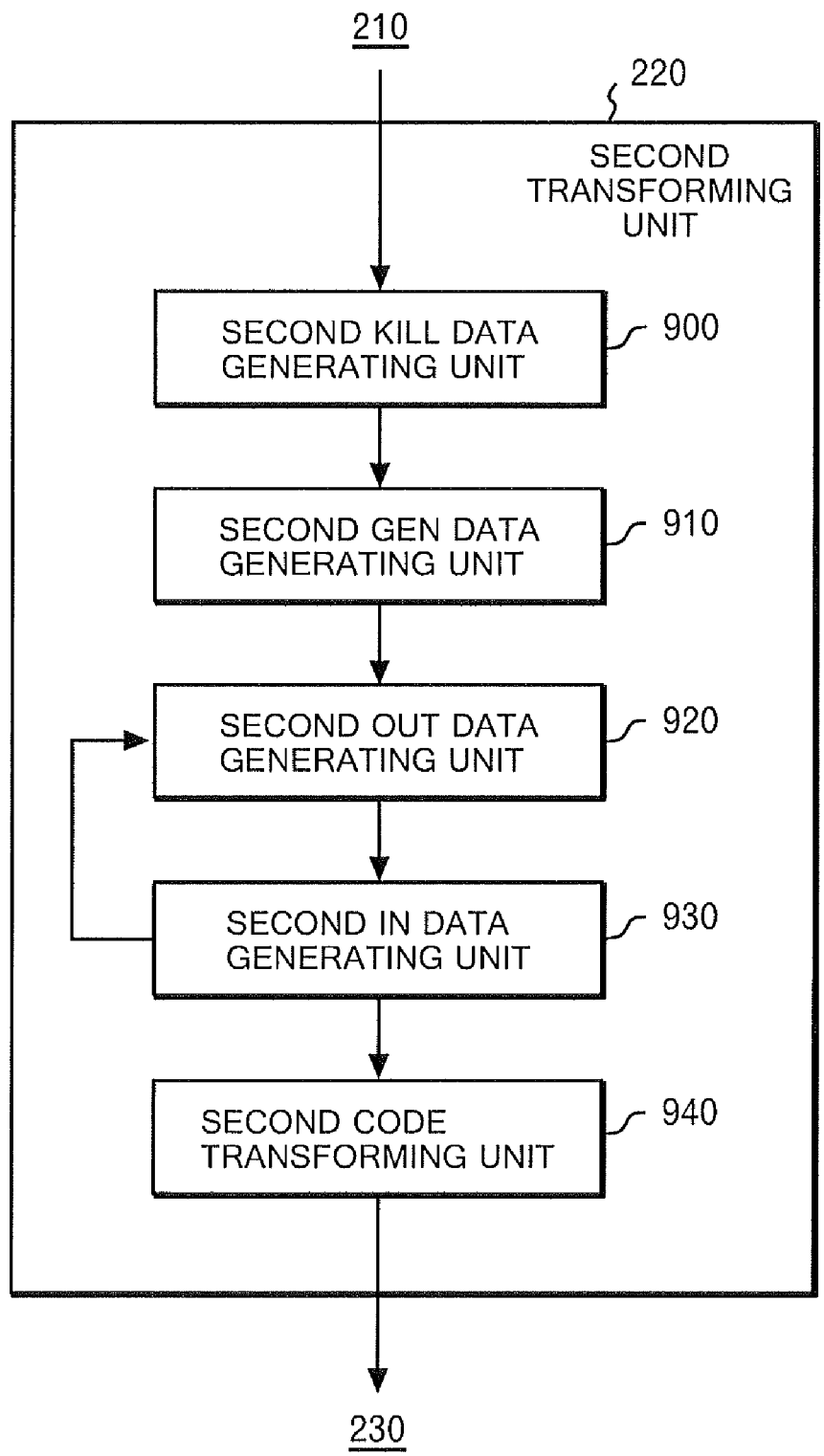
FIG. 9 shows a functional configuration of the second transformation unit, in accordance with embodiments of the present invention.

FIG. 9 shows a functional configuration of the second transformation unit 220, in accordance with embodiments of the present invention. With reference to FIG. 9, description will be given of processing functions which generalize the transformations shown in FIGS. 8a and 8b and thus make the transformations applicable to a wider variety of programs. The second transformation unit 220 includes a second KILL data generating unit 900, a second GEN data generating unit 910, a second OUT data generating unit 920, a second IN data generating unit 930, and a second code transforming unit 940, and is intended to optimize code movements by use of an iterative solving method of a data flow equation in a forward data flow. Note that, a definition of the data flow equation will be described for the most part, and details of the solving method will not be described. With respect to means that realizes information processing, please refer to, for example, page 844 of A. V. Aho, R. Sethi, and J. D. Ullman, "Compilers II—Principles, Techniques, and Tools " (translated into Japanese by Kenichi Harada), Published by Saiensu-sha Co. Ltd. (the third printing of the 1993 first edition), which is a prominent basic literature in this technical field.

Hereinafter, generation of KILL data, GEN data, OUT data and IN data in the data flow equation will be described. Each of these data represents a set whose elements are instructions in the target subprogram 40. Each of the instructions is denoted as a combination of a right-hand side and a left-hand side expressions indicating, respectively, contents of processing of the instruction and a variable in which a result of the processing is stored. First, the second KILL data generating unit 900 scans, for each basic block in the target subprogram 40, each instruction in the basic block by operations of the CPU 1500. Then, for each basic block therein, the second KILL data generating unit 900 selects a set of instructions from the plurality of instructions in the target subprogram 40. In each of the instructions in the selected set, the result of the processing indicated in the right-hand side, or the value of the variable indicated in the left-hand side, can be changed by at least any one of instructions in the basic block. Thereafter, the second KILL data generating unit 900 stores, in the memory, KILL data indicating the set of the instructions thus selected.

For example, on condition that an operation instruction a based on a certain variable x exists in the target subprogram 40, and that an assignment instruction for assigning the variable x exists in a certain basic block, the operation instruction a is added in the KILL data of this certain basic block. Additionally, on conditions that a read-out instruction for reading out from the memory exists in the target subprogram 40, and that an instruction for calling an unidentified function exists in a certain basic block, the read-out instruction b is added to the KILL data of this certain basic block. This is because, as a result of having contents of the memory rewritten by the unidentified function, a result (that is, contents of data supposed to be read out) of a right-hand side of the read-out instruction b can be changed.

Next, by operations of the CPU 1500, for each basic block in the target subprogram 40, the second GEN data generating unit 910 scans each instruction sequentially from the ending of that memory block in an order reverse to an execution order thereof. Then, for each instruction scanned, the second GEN data generating unit 910 sequentially selects an instruction on condition that the instruction scanned is not contained in the KILL data, or that, the instruction is contained in the KILL data because of existence of another instruction not scanned yet. For example, in a case where an instruction a exists in a certain basic block, the instruction a is added to the GEN data of the basic block under the following conditions. Specifically, the addition is done as long as there is not such another instruction that changes the result of the right-hand side of the instruction a, or that changes the value of a variable indicated in the left-hand side thereof. On the other hand, even if there is such another instruction that changes a result of the right-hand side of the instruction a, or that changes a value of a variable indicated in the left-hand side thereof, the instruction a may be added to the GEN data of the basic block. Such addition is done in a case where that instruction is scanned after the instruction a; that is, in a case where that instruction is executed before the instruction a.

For each basic block in the target subprogram 40, the second OUT data generating unit 920 reads out, from the memory, the KILL data and GEN data of the basic block by operations of the CPU 1500. Then, for each basic block therein, the second OUT data generating unit 920 performs an operation of excluding the KILL data of the basic block from IN data indicating a set of instructions that can be subjected to code movements to the beginning of the basic block. The second OUT data generating unit 920 calculates a set union of the GEN data of the basic block and the IN data after the exclusion. Then, the second OUT data generating unit 920 generates a result of the set operation as the OUT data indicating a set of instructions that can be subjected to code movements to the ending of the basic block, and stores the OUT data in the memory. This processing is expressed as a data flow expression shown as the following Equation (1).

$$\mathrm{OUT}(B) = (\mathrm{IN}(B) - \mathrm{KILL}(B)) \cup \mathrm{GEN}(B) \qquad (1)$$

Note that the IN data of a basic block which is executed earliest among all of the basic blocks in the target subprogram 40 may be an empty set, or may be a set of instructions which is obtained as a result of previously analyzing parts of a program which are not the subprogram 40.

By operations of the CPU 1500, for each basic block in the target subprogram 40, the second IN data generating unit 930 reads out, from the memory, the OUT data for each basic block executed immediately before the basic block. Then, the second IN data generating unit 930 generates the IN data of the basic blocks by performing an operation of calculating a set intersection of the OUT data of the above basic blocks. This processing is expressed as a data flow equation shown as the following Equation (2).

$$\mathrm{IN}(B) = \bigcap_{n \in Pred(B)} \mathrm{OUT}(n) \qquad (2)$$

Note that results of the processing performed by the second OUT data generating unit 920 and of the processing performed by the second IN data generating unit 930 influence each other. For this reason, when the second OUT data generating unit 920 generates the OUT data again according to the IN data generated by the second IN data generating unit 930, a result thus obtained sometimes differs from the previously generated OUT data. Therefore, the second OUT data generating unit 920 and the second IN data generating unit 930 repeat the processing thereof based on results of the processing of each other until the generated IN data and OUT data become the same as the previously generated IN data and OUT data and converge. Description of an iterative solving method and a method of convergence judgment for a data flow equation will be skipped as they have been publicly known conventionally.

Subsequently, by operations of the CPU 1500, the second code transforming unit 940 reads out, from the memory, the IN data corresponding to a basic block executed if a termination condition of loop processing is satisfied in the target subprogram 40. When a plurality of exits of the loop processing exist, there may possibly exist a plurality of basic blocks executed if the termination condition is satisfied. In that case, the IN data for the respective plurality of basic blocks are read out. Then, the second code transforming unit 940 inserts, into the respective plurality of basic blocks, instructions contained in the respective IN data. Processing of the insertion is realized by having the CPU 1500 rewrite the target subprogram 40 stored in the memory.

As has been described hereinabove, according to FIGS. 1 to 9, the dependencies among instructions in the target subprogram 40 can be matched with those in the pattern to be replaced 20 by changing phases of loop processing, and additionally changing a variable referred to from outside the loop processing into one referred to only from inside the loop processing. Next, optimization performed by the first transformation unit 210 will be described by referring to another program example as the target subprogram 40. Note that processing performed by the loop transforming unit 200 and the second transformation unit 220 does not influence this target subprogram 40, and description thereof will be skipped therefore.

Figure 10A:
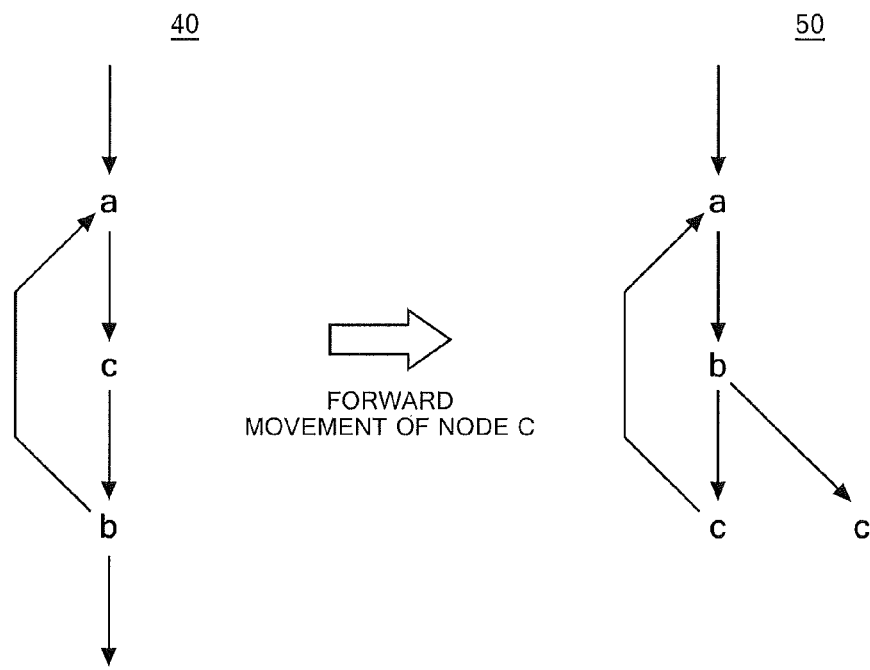
FIG. 10a shows an outline of processing in which the target subprogram is transformed by a first transformation unit.
Figure 10B:
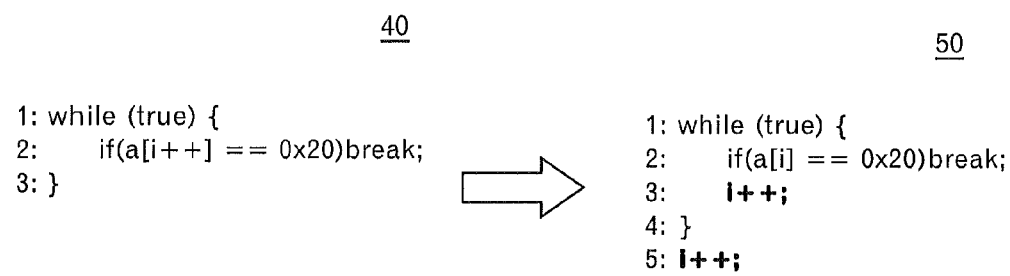
FIG. 10b shows a psuedocode of the target subprogram supposed to be transformed by the first transformation unit, in accordance with embodiments of the present invention.

FIG. 10a shows an outline of processing in which the target subprogram 40 is transformed by the first transformation unit 210, and FIG. 10b shows a psuedocode of the target subprogram 40 transformed by the first transformation unit 210, in accordance with embodiments of the present invention. As shown in the second line in the left side of FIG. 10b, this target subprogram 40 represents processing of reading out data from the memory at an address obtained by the following procedure. Firstly, an offset value given as a value of a variable i is added to an address given as a value of a variable a. Secondly, the variable i is incremented. Thirdly the data thus read out are compared with constant values. Then, as shown in the left side of FIG. 10a, an order of the symbols c and b is reverse in comparison to that in FIG. 3b. For this reason, the target subprogram 40 as it is cannot be replaced with a post-replacement instruction stream.

On this target subprogram 40, the first transformation unit 210 performs a transformation of moving an instruction executed before a conditional branch instruction to each of branch destinations of the conditional branch instruction to the extent that the transformation does not violate a dependency between the foregoing instruction and each of the other instructions. Specifically, the first transformation unit 210 performs a transformation of moving an instruction indicated by the symbol c to each of branch destinations of an instruction indicated by the symbol b. The result obtained by performing the movement on the target subprogram 40 is treated as the target subprogram 50. As shown in the right side of FIG. 10a, as a result of the movement of the symbol c to each branch destination of the symbol b, the symbol b and the symbol c switch their positions within loop processing, and the symbol c has been duplicated also to the outside of the loop processing. Likewise, as shown in the right side of FIG. 10b, an increment instruction for the variable i is duplicated to the fifth line outside the loop processing.

Figure 11:
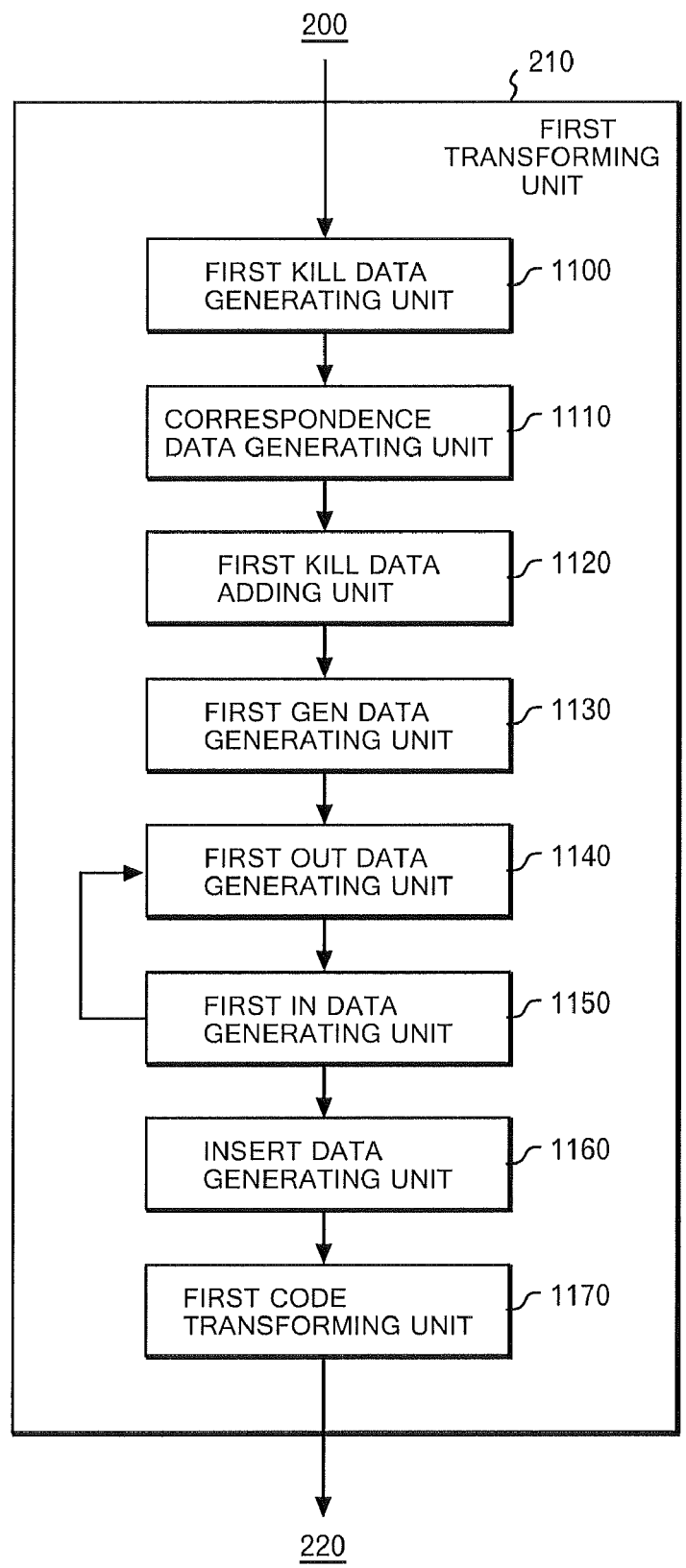
FIG. 11 shows a functional configuration of the first transformation un, in accordance with embodiments of the present invention.

FIG. 11 shows a functional configuration of the first transformation unit 210, in accordance with embodiments of the present invention. With reference to FIG. 11, description will be given of processing which generalizes the transformations shown in FIG. 10 to make the transformations applicable to a wider variety of programs. As in the case with the processing functions shown in FIG. 9, processing functions shown in FIG. 11 also perform optimization of code movements by use of an iterative solving method of a data flow equation in a forward data flow. Here, a definition of the data flow equation will be described for the most part, and, with respect to the iterative solving method, refer to FIG. 9 and A. V. Aho, R. Sethi, and J. D. Ullman, "Compilers II—Principles, Techniques, and Tools " (translated into Japanese by Kenichi Harada), Published by Saiensu-sha Co. Ltd. (the third printing of the 1993 first edition).

The first transformation unit 210 includes a first KILL data generating unit 1100, a correspondence data generating unit 1110, a first KILL data adding unit 1120, a first GEN data generating unit 1130, a first OUT data generating unit 1140, a first IN data generating unit 1150, an INSERT data generating unit 1160, and a first code transforming unit 1170. The first KILL data generating unit 1100 reads out the target subprogram 40 from the memory, and, for each basic block in the target subprogram 40, scans each of instructions in the basic block by operations of the CPU 1500. Then, for each basic block in the target subprogram 40, after selecting a set of instructions each of which is among a plurality of instructions in the target subprogram and has any data dependency with any instruction in the basic block, the first KILL data generating unit 1100 generates and stores in the memory, KILL data indicating the set of those instructions. The data dependencies include, for example, true dependence, anti dependence, and output dependence.

Subsequently, the correspondence data generating unit 1110 reads out the pattern to be replaced 20 from the memory by operations of the CPU 1500. Furthermore, according to an execution order of the instructions in the pattern to be replaced 20, the correspondence data generating unit 1110 generates correspondence data. The correspondence data is generated by having each of the instructions in the pattern to be replaced 20 set as a preceding instruction, and also having the preceding instruction correspond to a subsequent instruction executed in the pattern to be replaced 20 subsequent to the preceding instruction. The correspondence data are then stored in the memory. For example, in the pattern to be replaced 20, if the instruction indicated by the symbol a is the preceding instruction, the subsequent instruction thereof is indicated by the symbol b. Accordingly, the symbols a and b correspond to each other. Likewise, the symbols b and c correspond to each other, and the symbols c and d correspond to each other. The correspondence data thus generated is outputted to the first KILL data adding unit 1120.

The first KILL data adding unit 1120 scans, for each basic block in the target subprogram 40, each of instruction in the basic block by operations of the CPU 1500. Then, for each basic block therein, on condition that the first KILL data adding unit 1120 has retrieved any one of the subsequent instructions in the correspondence data, the first KILL data adding unit 1120 adds, to the KILL data corresponding to the basic block, the preceding instruction corresponding to that subsequent instruction. The addition processing of the instruction to the KILL data is realized by rewriting the KILL data stored in the memory.

By operations of the CPU 1500, for each basic block in the target subprogram 40, the first GEN data generating unit 1130 scans instructions sequentially from the ending of the basic block in the order reverse to the order for execution thereof. Then, sequentially for each instruction thus scanned, the first GEN data generating unit 1130 selects an instruction on condition that the instruction is not contained in the KILL data, or that the instruction is contained in the KILL data because of existence of another instruction that has not been scanned yet.

Then, the first GEN data generating unit 1130 generates and stores in the memory GEN data indicating a set of those selected instructions.

For example, there is a case where an instruction a in a certain basic block has no data dependencies with any other instruction in the same basic block, and, at the same time, the subsequent instruction having the instruction a as the preceding instruction thereof in the correspondence data is not contained in the same basic block. In such a case, the instruction a is added to the GEN data of the basic block. On the other hand, a case is assumed where the subsequent instruction of the instruction a, or part of the other instruction having a dependency with the instruction a, is contained in the same basic block. Even in such a case, the instruction a is added to the GEN data of the same basic block as long as the subsequent instruction or the other instruction has not been scanned yet (that is, in a case where the subsequent instruction thereof or the other instruction is executed before the instruction a).

For each basic block in the target subprogram 40, the first OUT data generating unit 1140 reads out, from the memory, the KILL data and GEN data of the basic block by operations of the CPU 1500. Then, for each basic block therein, the first OUT data generating unit 1140 generates OUT data. When the OUT data are generated by operations of the CPU 1500, a set union of the GEN data of the basic block and the IN data is calculated after the KILL data of the basic block are excluded from the IN data. Note that the IN data indicates a set of instructions that can be subjected to code movements to the beginning of the basic block, while the OUT data indicates a set of instructions that can be subjected to code movements to the ending of the basic block. This processing is expressed as a data flow expression shown as the following Equation (3).

$$OUT(B) = (IN(B) - KILL(B)) \cup GEN(B) \quad (3)$$

For each basic block in the target subprogram 40, the first IN data generating unit 1150 reads out from the memory the OUT data of each basic block executed immediately prior to the basic block. Then, the first IN data generating unit 1150 generates the IN data of the basic block by performing an operation of calculating a set intersection of the OUT data of the above basic blocks by operations of the CPU 1500. This processing is expressed as a data flow equation shown as the following Equation (4).

$$IN(B) = \bigcap_{n \in Pred(B)} OUT(n) \quad (4)$$

The results of the processing performed by the first OUT data generating unit 1140 and the first IN data generating unit 1150 influence each other. For this reason, the first OUT data generating unit 1140 and the first IN data generating unit 1150 repeat, according to results of the processing of each other, the processing of these respective units until the results of the operations of these units converge.

For each basic block in the target subprogram 40, the INSERT data generating unit 1160 reads out from the memory the IN data of the basic block, and the OUT data of each basic block executed immediately prior to the basic block. Then, the INSERT data generating unit 1160 generates INSERT data by performing, by operations of the CPU 1500, an operation of excluding a set intersection of the foregoing OUT data from the foregoing IN data. The INSERT data indicates a set of instruction that should be generated within the basic block. This processing is expressed by the following Equation (5).

$$\text{INSERT}(B) = \text{IN}(B) - \left( \bigcap_{n \in Pred(B)} \text{OUT}(n) \right) \quad (5)$$

Then, the first data transforming unit 1170 transforms the target subprogram 40 by operations of the CPU 1500, and, for each basic block in the target subprogram, inserts instructions contained in the INSERT data of the basic block into a part executed prior to other instructions in the basic block which have data dependencies with the foregoing instructions. In a case where there are not such other instructions that have data dependencies with those instructions, those instructions may be inserted into any part. The processing of inserting the instructions is realized by rewriting, by operations of the CPU 1500, the target subprogram 40 stored in the memory.

Figure 12:
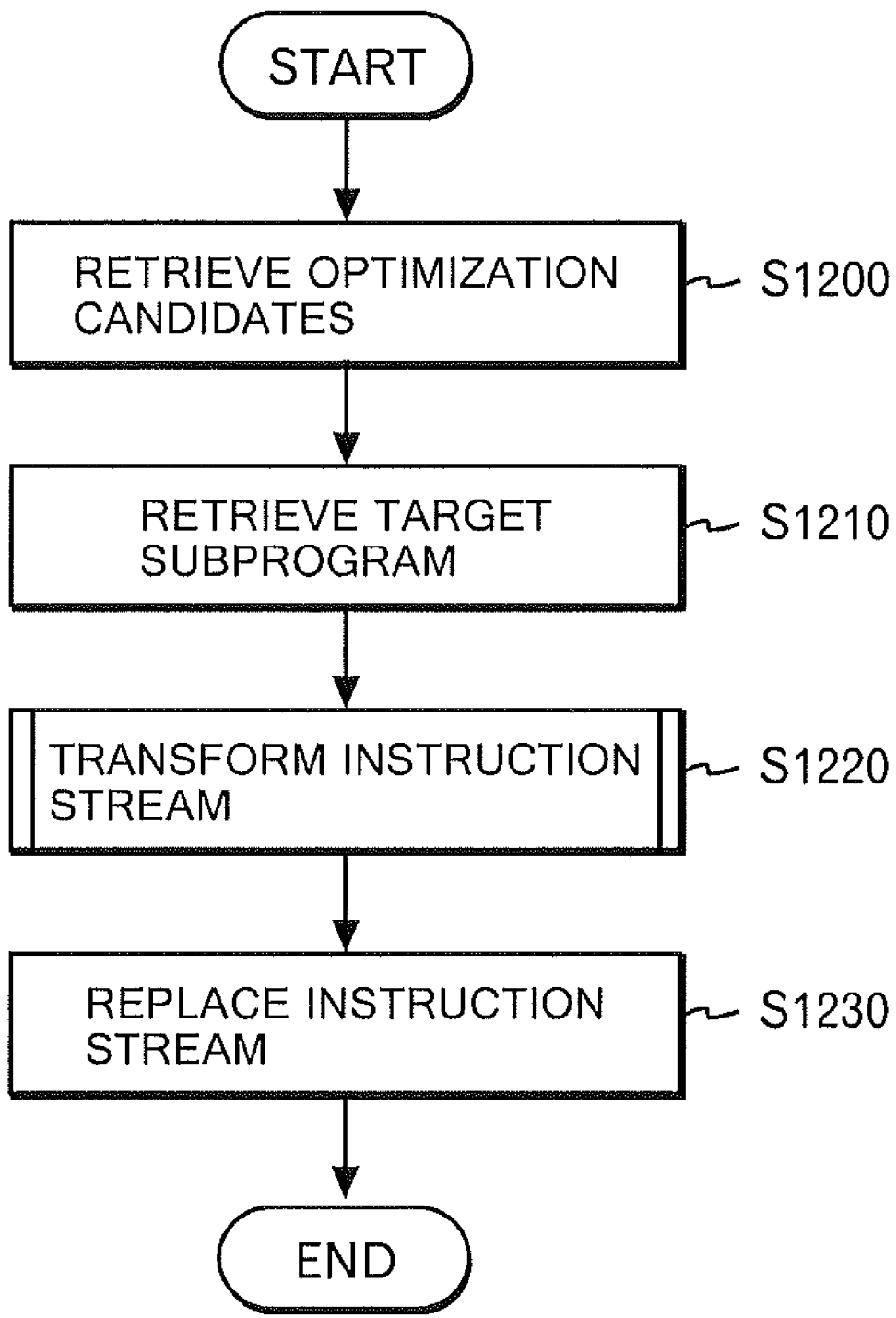
FIG. 12 is a flowchart of processing of compiling a target program by using the compiler apparatus.

FIG. 12 is a flowchart of processing for compiling a target program by using the compiler apparatus 10, in accordance with embodiments of the present invention. By operations of the CPU 1500, the optimization candidate retrieving unit 100 retrieves candidates of a subprogram to be optimized (S1200). For example, the optimization candidate retrieving unit 100 may retrieve an instruction stream of a subprogram, in the form of a processing unit of programs which is called a method, a function or a procedure as a subprogram candidate. Alternatively, the optimization candidate retrieving unit 100 or may retrieve, as a subprogram candidate, an instruction stream determined according to a nature of a control flow as in the case with loop processing or the like.

Then, from among a plurality of subprograms retrieved by the optimization candidate retrieving unit 100, the target subprogram retrieving unit 110 retrieves a subprogram similar to a pattern to be replaced as a target subprogram 40 (S1210). In more detail, by using a technique of topological embedding described in Jianghai Fu, "Directed Graph Pattern Matching and Topological Embedding," Journal of Algorithms 22(2), pp. 372-391 (Feb. 1997), the target subprogram retrieving unit 110 may detect a dependency graph isomorphic to that of the pattern to be replaced 20. Instead, according to a method described in S. S. Muchnick, "Advanced Compiler Design and Implementation," Morgan Kaufmann Publishers, Inc. (1997), the target subprogram retrieving unit 110 may detect a fragment of the program having the largest common part with the pattern to be replaced 20 to detect a dependency graph isomorphic to that of the pattern to be replaced 20. By any one of these techniques, isomorphism between the dependency graphs can be judged isomorphic even in a case where any node is contained between nodes in the dependency graph of the pattern to be replaced 20.

An example of processing of detecting the isomorphic dependency graph by employing any one of these techniques will be described further in detail. First, the target subprogram retrieving unit 110 analyzes dependencies among instructions contained in the pattern to be replaced 20 to generate a dependency graph having the instructions and the dependencies of execution among the instructions as nodes and directed edges, respectively. Note that, as the pattern to be replaced 20 is an instruction code, the target subprogram retrieving unit 110 may transform the instruction code into the dependency graph as needed, or the compiler apparatus 10 may have in advance stored data of the dependency graph, into which the instruction code is transformed. Likewise, also with respect to each of the candidates of a subprogram to be optimized, the target subprogram retrieving unit 110 analyzes dependencies of execution among instructions therein, and then generates a dependency graph having the instructions and the dependencies of execution among these plural instructions as nodes and directed edges, respectively.

Then, as to loop processing, the target subprogram retrieving unit 110 treats a dependency graph thereof as a tree structure. For example, the instruction stream shown in FIG. 5*c* is treated as "c->a->S->b1->b2->c->a->S->b1->b2 . . ." By employing any one of the techniques by which a dependency graph is judged to be isomorphic even when any additional node is contained between the existing nodes, the instructions a, b1, b2 and c are retrieved in this order as shown by bolded italics added as follows: "c->*a*->S->*b1*->*b2*->c->*a*->S->*b1*->*b2* . . ." As shown in FIG. 3*b*, the pattern to be replaced 20 is a loop processing containing the instructions a, b and c in this order, and the instruction b is judged to be isomorphic to any number of conditional branch instructions (for example, b1 and b2). Consequently, the pattern to be replaced 20 and the target subprogram 40 are judged to be isomorphic to each other.

Thus, according to the dependency graphs, the target subprogram retrieving unit 110 judges for each of the subprograms whether instructions corresponding to all of the instructions contained in the pattern to be replaced 20 are executed in the execution order indicated by dependencies of execution among the instructions in the pattern to be replaced 20. Then, the compiler apparatus 10 detects the subprograms as the target subprogram if it judges that the instructions thereof corresponding to all of the instructions in the pattern to be replaced 20 are executed. For example, the subprograms shown respectively in the left sides of FIGS. 5*c* and 10*a* are retrieved from the target program properly, and are detected as the target subprograms 40.

Subsequently, the instruction stream transforming unit 120 performs a transformation on instructions which are contained in the target subprograms 40, and which are other than instructions corresponding to the instructions contained in the pattern to be replaced 20, and on instructions having dependencies of execution different from those in the pattern to be replaced 20 as well. By the transformation, dependencies among the instructions contained in the target subprogram 40 are matched with those in the pattern to be replaced 20 (S11220). The instruction stream transforming unit 120 may perform the transformation on other instructions when necessary. The target subprogram thus transformed is treated as a target subprogram 50.

By operations of the CPU 1500, the instruction stream replacing unit 130 replaces, with the post-replacement instruction stream determined correspondingly to the pattern to be replaced 20, the target subprogram 50 obtained by the transformation by the instruction stream transforming unit 120 (S1230). For example, the instruction stream replacing unit 130 may generate the post-replacement instruction stream by replacing each variable in the post-replacement instruction template 30, which indicates a structure of the post-replacement instruction stream, with a variable contained in the target subprogram 50 corresponding to the variable. Details thereof have been described with reference to FIG. 4.

Figure 13:
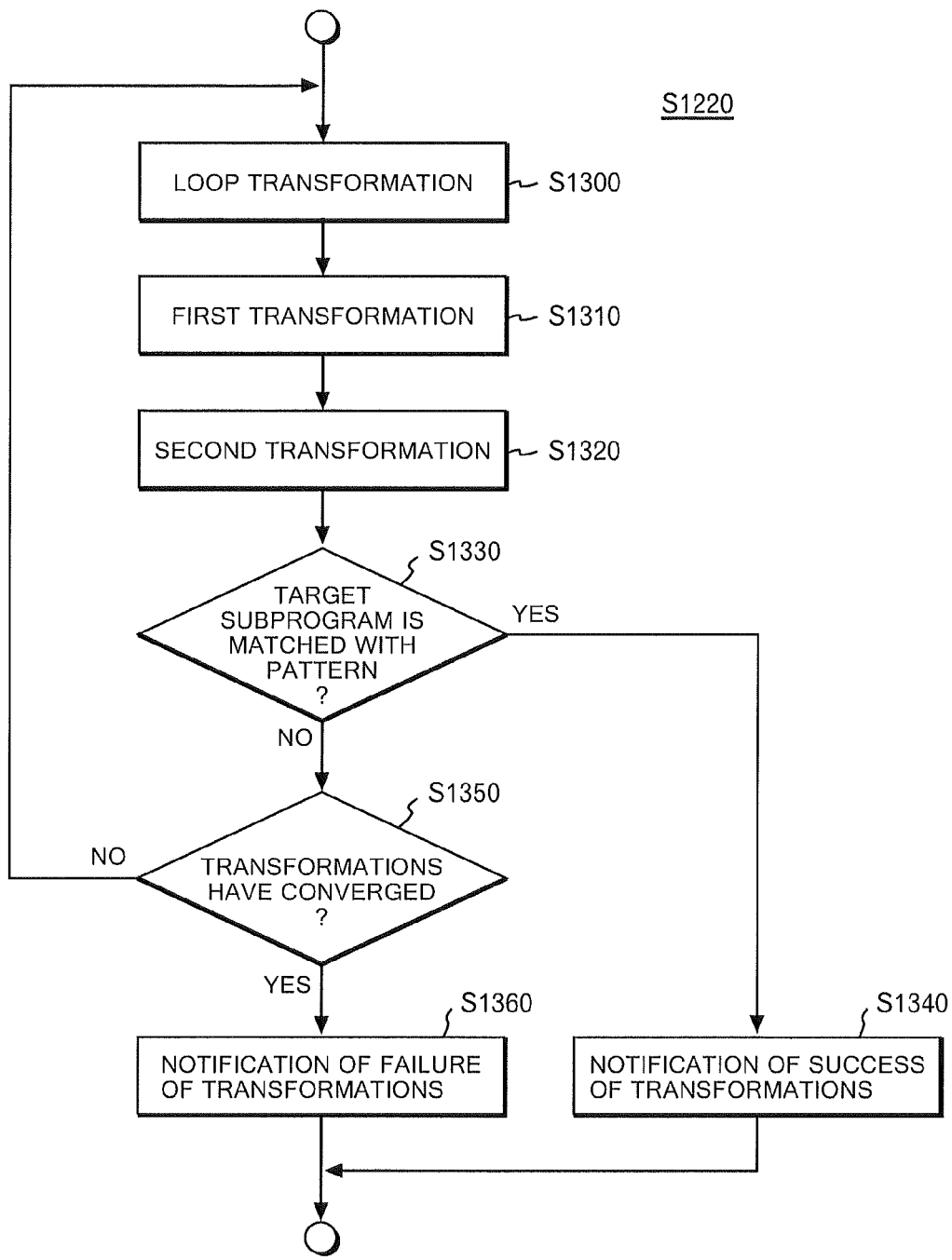
FIG. 13 shows details of the step in FIG. 12 of transforming the instruction stream.

FIG. 13 shows details of processing in S1220, in accordance with embodiments of the present invention. The loop transforming unit 200 reads out the target subprogram 40 stored in the memory, and performs processing for changing phases of instruction execution when loop processing is regarded as cyclic execution of a plurality of instructions (S1300). Specifically, the loop transforming unit 200 duplicates, to a part executed prior to the start of the loop processing, part of the instructions contained in the target subprogram 40 and executed at the beginning of loop processing. Then, the loop transforming unit 200 moves all the instructions other than the part of instructions thus duplicated to the beginning of the loop processing, and moves the part of the instructions subsequent to these other instructions. Thus, the loop transforming unit 200 matches the dependencies among the instructions contained in the target subprogram 40 with those in the pattern to be replaced 20. What range of instructions from the beginning of the loop processing is duplicated is determined according to an instruction at the beginning of loop processing in the pattern to be replaced. The instructions after the transformation are stored in the memory.

Next, the first transformation unit 210 matches the dependencies among the instructions contained in the target subprogram 40 with those in the pattern to be replaced 20 by performing, by operations of the CPU 1500, a transformation of moving an instruction executed prior to a conditional branch instruction to each of branch destinations of the conditional branch instruction (S1310). This transformation is realized by, according to the dependencies among the instructions in the pattern to be replaced 20, changing a data flow function for searching a range to which the instructions can be moved within a range where the data dependencies can be retained.

Subsequently, a transformation by the second transformation unit 220 is tried on condition that the pattern to be replaced 20 contains, in loop processing, a first instruction for assigning an operation result to a variable, and that the pattern to be replaced 20 contains an instruction for referring to a content of the variable in a part executed subsequently to the loop processing (S1320). The second transformation unit 220 reads out the target subprogram 40 after the foregoing transformations from the memory. Then, by operations of the CPU 1500, the second transformation unit 220 performs a transformation of duplicating the first instruction to a part next executed if a termination condition of the loop processing is satisfied. Thus, the dependencies among the instructions contained in the target subprogram 40 are compared with the dependencies among the instructions contained in the pattern to be replaced 20 except the first instruction.

The judgment unit 230 judges whether the dependencies among the instructions contained in the target subprogram 40 are matched with those in the pattern to be replaced 20 (S1330). If they are not matched (NO in S1330), the judgment unit 230 judges whether the transformation processing has converged by checking that the transformations performed by the loop transforming unit 200, the first transformation unit 210 and the second transformation unit 220 is the same as the result of previous transformations performed by the loop transforming unit 200, the first transformation unit 210 and the second transformation unit 220 (S1350). If the processing has converged (YES in S1350), the judgment unit 230 informs the instruction stream replacing unit 130 that the transformations have ended in failure, and terminates the processing (S1360). If the processing is not yet converged (NO in S1350), the processing is returned to S1300 so that the transformed target subprogram 40 can be further transformed by the loop transforming unit 200, the first transformation unit 210 and the second transformation unit 220. If the dependencies among the instructions contained in the target subprogram 40 are matched with those in the pattern to be replaced 20 (YES in S1330), the judgment unit 230 informs the instruction stream replacing unit 130 that they are matched (S1340), and thereby causes the instruction stream replacing unit 130 to replace the instruction stream.

Figure 14:
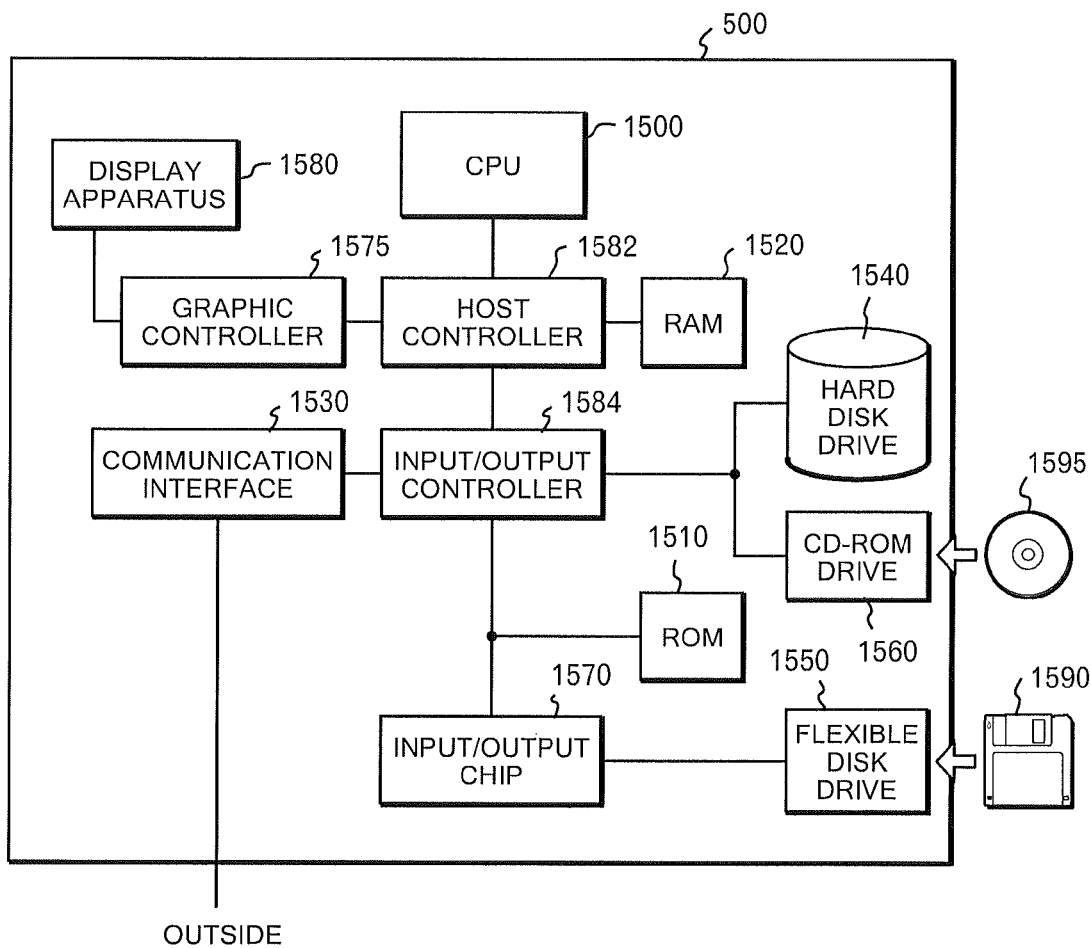
FIG. 14 shows one example of a hardware configuration of an information processing apparatus functioning as the compiler apparatus, in accordance with embodiments of the present invention.
Figure 15:
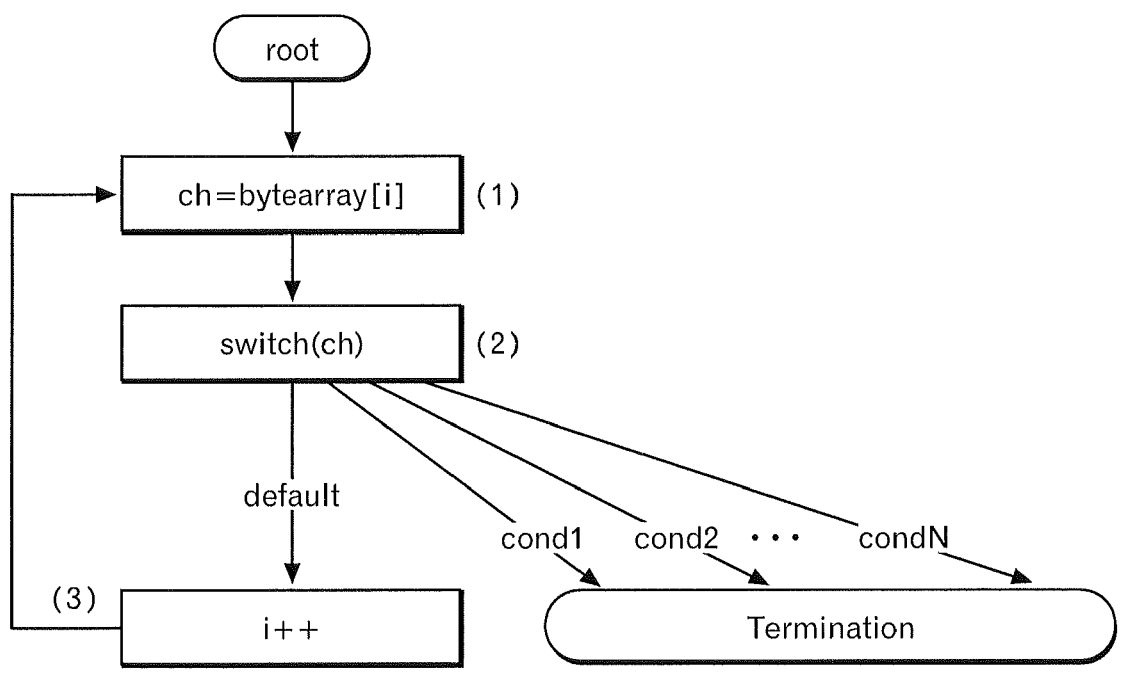
FIG. 15 is a control flow graph corresponding to processing performed by the TRT instruction, in accordance with the related art.

FIG. 14 shows one example of a hardware configuration of an information processing apparatus 500 functioning as a compiler apparatus 10, in accordance with embodiments of the present invention. The information processing apparatus 500 includes: a CPU peripheral section having the CPU 1500, the RAM 1520, and a graphic controller 1575 which are mutually connected by a host controller 1582; an input/output section having a communication interface 1530, a hard disk drive 1540, and a CD-ROM drive 1560 which are connected to the host controller 1582 by an input/output controller 1584; and a legacy input/output section having a ROM 1510, a flexible disk drive 1550, and an input/output chip 1570 which are connected to the input/output controller 1584.

The host controller 1582 connects the RAM 1520 with the CPU 1500 and the graphic controller 1575 which access the RAM 1520 at high transfer rates. The CPU 1500 operates according to programs stored in the ROM 1510 and RAM 1520, and thereby performs control over the respective sections. The graphic controller 1575 acquires image data generated by the CPU 1500 or the like on a frame buffer provided in the RAM 1520, and displays the image data on a display apparatus 1580. Instead of this, the graphic controller 1575 may include, inside itself, a frame buffer in which the image data generated by the CPU 1500 or the like is stored.

The input/output controller 1584 connects the host controller 1582 with the communication interface 1530, the hard disk drive 1540 and the CD-ROM drive 1560 which are relatively high speed input/output devices. The communication interface 1530 communicates with an external apparatus through a network. The hard disk drive 1540 stores therein programs and data which are used by the information processing apparatus 500. The CD-ROM drive 1560 reads out a program or data from a CD-ROM 1595, and provides the program or data to the RAM 1520 or the hard disk drive 1540.

Besides, the ROM 1510, and relatively low speed input/output devices, such as the flexible disk drive 1550 and the input/output chip 1570, are connected to the input/output controller 1584. The ROM 1510 stores therein: a boot program executed by the CPU 1500 at the startup of the information processing apparatus 500; and other programs dependent on hardware of the information processing apparatus 500; and the like. The flexible disk drive 1550 reads out a program or data from a flexible disk 1590, and provides the program or data through the input/output chip 1570 to the RAM 1520 or to the hard disk drive 1540. The input/output chip 1570 connects, to the CPU 1500, the flexible disk 1590, and various kinds of input/output devices through, for example, a parallel port, a serial port, a keyboard port, a mouse port and the like.

A program provided to the information processing apparatus 500 is provided by a user in a state where stored in a recording medium such as the flexible disk 1590, the CD-ROM 1595, or an IC card. The program is executed after the program is read out from the recording medium through at least any one of the input/output chip 1570 and input/output controller 1584, and then installed in the information processing apparatus 500. Description on operations that the program causes the information processing apparatus 500 to perform will be skipped because these operations are identical to those in the compiler apparatus 10, which have been described in connection with FIGS. 1 to 13.

The program described above may be stored in an external recording medium. As the recording medium, apart from the flexible disk 1590 and the CD-ROM 1595, it is possible to use: an optical recording medium such as a DVD or a PD; a magneto optical recording medium such as an MD; a tape medium; a semiconductor memory such as an IC card; or the like. Additionally, it is also possible to use, as the recording medium, a recording device, such as a hard disk or a RAM, provided in a server system connected to a network, and thereby provide the program to the information processing apparatus 500 through the network.

As has been described hereinabove, according to the compiler apparatus 10 of the present invention, optimization can be performed not only in a case where a pattern of an instruction stream replaceable with an instruction executable at a higher speed has been retrieved. In a case where an instruction stream is similar to such a pattern but is not perfectly matched, the instruction stream can be matched with the pattern by subjecting the instruction stream to code transformations as described supra. Thereby, an execution efficiency of a program can be enhanced by utilizing a special instruction with which a high-performance computer is equipped. When performance assessment was conducted by using a benchmark program by which character code replacement is performed, increases in performance of 2.35 to 4.54 times as high as a conventional case was observed in cases of various programs.

While the present invention has been described hereinabove by using the embodiment, a technical scope of the present invention is not limited to the scope described in the abovementioned embodiment. It is apparent to those skilled in the art that various modifications or improvements can be made to the abovementioned embodiment. It is also apparent from the scope of claims that embodiments to which such modifications or improvements have been made can also be included in the technical scope of the present invention.

What is claimed is:

1. A method for optimizing a target program comprising a pattern to be replaced, said pattern comprising instructions, said method being performed by execution of program code by a processor of an information processing apparatus that comprises a computer readable storage medium and an output device, said program code stored on the computer readable storage medium, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

2. The method of claim 1, wherein said performing at least one transformation comprises said performing the first transformation.

3. The method of claim 1, wherein said performing at least one transformation comprises performing both the first transformation and the loop transformation.

4. The method of claim 1, wherein said performing at least one transformation comprises said performing the loop transformation.

5. The method of claim 4,
wherein the loop processing further comprises a first instruction for assigning a value to a variable;
wherein the target subprogram comprises a second instruction for referring to the value of the variable outside of the loop processing;
wherein the at least one transformation comprises a second transformation;
wherein said performing the second transformation comprises duplicating the first instruction, followed by inserting the duplicated first instruction into a part of the target subprogram that is executed in response to satisfaction of a termination condition of the loop processing;
wherein said performing the second transformation results in second dependencies among the instructions comprised by the target subprogram being matched with corresponding dependencies in the pattern to be replaced;
wherein said performing the second transformation further results in the value of the variable being referred to in the target subprogram from only inside the loop processing.

6. The method of claim 4,
wherein the method further comprises executing iterations of a loop;
wherein executing each iteration of the loop comprises said performing at least one transformation on the target program, followed by ascertaining whether the at least one transformation in said each iteration has not changed from the at least one transformation in a prior iteration of the loop that immediately precedes said each iteration;
wherein in a terminating iteration of the loop, said ascertaining ascertains that the at least one transformation in the terminating iteration has not changed from a prior iteration of the loop that immediately precedes the terminating iteration.

7. The method of claim 6,
wherein in at least one iteration of the loop prior to the terminating iteration, said ascertaining ascertains that the at least one transformation in each iteration of the at least one iteration has changed from the at least one transformation in a prior iteration of the loop that immediately precedes each iteration of the at least one iteration.

8. The method of claim 1, wherein the optimized target program is configured to be executed by the processor by a factor from 2.35 to 4.54 faster than the target program prior to the target program being optimized by performance of said method.

9. An information processing apparatus comprising a processor, a computer readable storage medium, and an output device, said storage medium comprising program code configured to be executed by the processor to implement a method for optimizing a target program comprising a pattern to be replaced, said pattern comprising instructions, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

10. The apparatus of claim 9, wherein said performing at least one transformation comprises said performing the first transformation.

11. The apparatus of claim 9, wherein said performing at least one transformation comprises performing both the first transformation and the loop transformation.

12. The apparatus of claim 9, wherein said performing at least one transformation comprises said performing the loop transformation.

13. The apparatus of claim 12,
wherein the loop processing further comprises a first instruction for assigning a value to a variable;
wherein the target subprogram comprises a second instruction for referring to the value of the variable outside of the loop processing;
wherein the at least one transformation comprises a second transformation;
wherein said performing the second transformation comprises duplicating the first instruction, followed by inserting the duplicated first instruction into a part of the target subprogram that is executed in response to satisfaction of a termination condition of the loop processing;
wherein said performing the second transformation results in second dependencies among the instructions comprised by the target subprogram being matched with corresponding dependencies in the pattern to be replaced;
wherein said performing the second transformation further results in the value of the variable being referred to in the target subprogram from only inside the loop processing.

14. The apparatus of claim 12,
wherein the method further comprises executing iterations of a loop;
wherein executing each iteration of the loop comprises said performing at least one transformation on the target program, followed by ascertaining whether the at least one transformation in said each iteration has not changed from the at least one transformation in a prior iteration of the loop that immediately precedes said each iteration;
wherein in a terminating iteration of the loop, said ascertaining ascertains that the at least one transformation in the terminating iteration has not changed from a prior iteration of the loop that immediately precedes the terminating iteration.

15. A computer program product, comprising a computer readable physically tangible storage medium having program code stored therein, said program code configured to be executed by a processor of an information processing apparatus to implement a method for optimizing a target program comprising a pattern to be replaced, said pattern comprising instructions, said information processing apparatus comprising a physically tangible output device, said method comprising:

retrieving a target subprogram comprising instructions corresponding to the instructions of the pattern to be replaced;

performing at least one transformation on the target program to generate a transformed target subprogram in which dependencies among the instructions comprised by the target subprogram are matched with dependencies in the pattern to be replaced; and replacing the transformed target subprogram, with a post-replacement instruction stream determined to correspond to the pattern to be replaced, to generate a replaced target subprogram;

outputting an optimized target program that includes the replaced target subprogram to the output device of the information processing apparatus;

wherein the at least one transformation comprises a first transformation, a loop transformation, or both the first transformation and the loop transformation;

wherein performing the first transformation comprises moving an instruction of the target subprogram executed prior to a conditional branch instruction of the target subprogram to each branch destination of the conditional branch instruction, said performing the first transformation resulting in first dependencies among the instructions comprised by the target subprogram being matched with corresponding dependencies in the pattern to be replaced;

wherein performing the loop transformation comprises changing phases of instruction execution for loop processing in the target subprogram with respect to a first group of instructions at a beginning of the loop processing and a second group of instructions following the first group of instructions in the loop processing, said changing phases of instruction execution resulting in loop dependencies among the instructions comprised by the target subprogram being matched with corresponding dependencies in the pattern to be replaced;

wherein said changing phases of instruction execution comprises duplicating the first group of instructions from the loop processing, moving the second group of instructions to the beginning of the loop processing, copying the duplicated first group of instructions to after the second group of instructions in the loop processing, and copying at least one instruction of the duplicated first group of instructions to before the loop processing.

16. The computer program product of claim 15, wherein said performing at least one transformation comprises said performing the first transformation.

17. The computer program product of claim 15, wherein said performing at least one transformation comprises performing both the first transformation and the loop transformation.

18. The computer program product of claim 15, wherein said performing at least one transformation comprises said performing the loop transformation.

19. The computer program product of claim 18,
wherein the loop processing further comprises a first instruction for assigning a value to a variable;
wherein the target subprogram comprises a second instruction for referring to the value of the variable outside of the loop processing;
wherein the at least one transformation comprises a second transformation;
wherein said performing the second transformation comprises duplicating the first instruction, followed by inserting the duplicated first instruction into a part of the target subprogram that is executed in response to satisfaction of a termination condition of the loop processing;
wherein said performing the second transformation results in second dependencies among the instructions comprised by the target subprogram being matched with corresponding dependencies in the pattern to be replaced;
wherein said performing the second transformation further results in the value of the variable being referred to in the target subprogram from only inside the loop processing.

20. The computer program product of claim 18,
wherein the method further comprises executing iterations of a loop;
wherein executing each iteration of the loop comprises said performing at least one transformation on the target program, followed by ascertaining whether the at least one transformation in said each iteration has not changed from the at least one transformation in a prior iteration of the loop that immediately precedes said each iteration;
wherein in a terminating iteration of the loop, said ascertaining ascertains that the at least one transformation in the terminating iteration has not changed from a prior iteration of the loop that immediately precedes the terminating iteration.

* * * * *